(12) United States Patent
Oh et al.

(10) Patent No.: US 12,216,955 B2
(45) Date of Patent: Feb. 4, 2025

(54) USER TERMINAL TO WHICH EXTERNAL DISPLAY MAY BE CONNECTED AND CONTROL METHOD THEREFOR

(71) Applicant: LG ELECTRONICS INC., Seoul (KR)

(72) Inventors: Hwajun Oh, Seoul (KR); Hyeran Jang, Seoul (KR); Hyein Jung, Seoul (KR); Yongdeok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/068,988

(22) Filed: Dec. 20, 2022

(65) Prior Publication Data
US 2024/0045637 A1 Feb. 8, 2024

(30) Foreign Application Priority Data
Aug. 8, 2022 (WO) ................ PCT/KR2022/011747

(51) Int. Cl.
*G06F 3/14* (2006.01)
*G06F 3/0484* (2022.01)

(52) U.S. Cl.
CPC .......... *G06F 3/1423* (2013.01); *G06F 3/0484* (2013.01)

(58) Field of Classification Search
CPC .............................. G06F 3/0484; G06F 3/1423
See application file for complete search history.

(56) References Cited

U.S. PATENT DOCUMENTS

| 9,710,217 B2* | 7/2017 | DeLuca | G06F 3/1446 |
| 2010/0293502 A1* | 11/2010 | Kang | G06F 1/1626 715/810 |
| 2012/0060089 A1* | 3/2012 | Heo | G06F 3/04883 715/702 |
| 2014/0009394 A1* | 1/2014 | Lee | H04N 21/41407 345/157 |

(Continued)

FOREIGN PATENT DOCUMENTS

| JP | 2018017758 | 2/2018 |
| KR | 1020070019379 | 2/2007 |

(Continued)

OTHER PUBLICATIONS

PCT International Application No. PCT/KR2022/011747 International Search Report dated May 8, 2023, 9 pages.

*Primary Examiner* — Andrea C Leggett
(74) *Attorney, Agent, or Firm* — LEE, HONG, DEGERMAN, KANG & WAIMEY

(57) ABSTRACT

The present disclosure relates to a user terminal to which an external display may be connected, and a control method therefor. The user terminal includes a main display, an interface unit for being connected to the external device equipped with a sub-display, and a controller that controls, in response to detection of the connection with the external device via the interface, a plurality of position icons for specifying a position of the sub-display to be displayed on the main display, and controls, in response to selection of a desired position icon among the plurality of position icons, connection setting of the sub-display to be performed based on the sub-display being disposed at a first desired position corresponding to the selected desired position icon.

22 Claims, 34 Drawing Sheets

(56) References Cited

U.S. PATENT DOCUMENTS

| | | | | |
|---|---|---|---|---|
| 2014/0359454 | A1* | 12/2014 | Lee | G06F 3/048 |
| | | | | 715/734 |
| 2016/0018941 | A1* | 1/2016 | Kim | G06F 9/451 |
| | | | | 345/173 |
| 2016/0147498 | A1* | 5/2016 | Son | G06F 3/005 |
| | | | | 345/2.2 |
| 2017/0357473 | A1* | 12/2017 | Kim | G06F 1/3287 |
| 2021/0224019 | A1* | 7/2021 | Leu | G06F 3/1454 |
| 2021/0366440 | A1* | 11/2021 | Burns | G06F 3/011 |
| 2022/0284838 | A1* | 9/2022 | Takeuchi | G06F 3/0481 |
| 2022/0391158 | A1* | 12/2022 | Lemmens | G06F 3/1454 |

FOREIGN PATENT DOCUMENTS

| | | |
|---|---|---|
| KR | 1020170084586 | 7/2017 |
| KR | 1020200121680 | 10/2020 |
| KR | 102254856 | 5/2021 |

\* cited by examiner

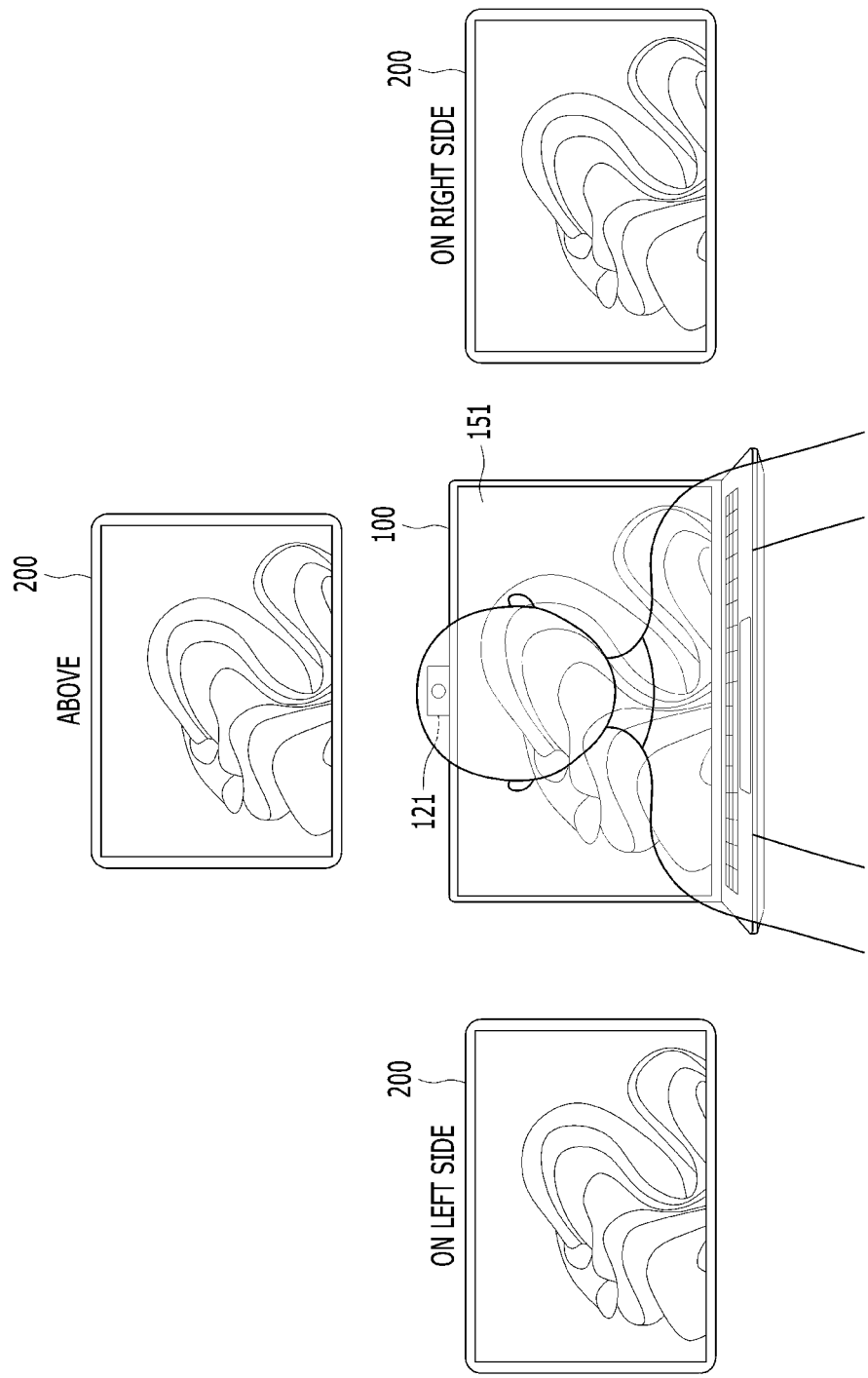

USER TERMINAL TO WHICH EXTERNAL DISPLAY MAY BE CONNECTED AND CONTROL METHOD THEREFOR

Pursuant to 35 U.S.C. § 119, this application claims the benefit of an earlier filing date and right of priority to International Application No. PCT/KR2022/011747, filed on Aug. 8, 2022, the contents of which are hereby incorporated by reference herein in its entirety.

BACKGROUND OF THE DISCLOSURE

Field of the Disclosure

The present disclosure relates to a user terminal to which an external display may be connected, and relates to a control method for connecting the external display to the user terminal.

Discussion of the Related Art

User terminals may be generally classified as mobile/portable terminals or stationary terminals according to their mobility. User terminals may also be classified as handheld terminals or vehicle mounted terminals according to whether or not a user can directly carry the terminal.

User terminals have become increasingly more functional. Examples of such functions include data and voice communications, capturing images and video via a camera, recording audio, playing music files via a speaker system, and displaying images and video on a display. Some user terminals include additional functionality which supports game playing, while other terminals are configured as multimedia players. More recently, user terminals have been configured to receive broadcast and multicast signals which permit viewing of content such as videos and television programs.

User terminals may be configured as multimedia players capable of performing various functions such as capturing images and video, recording audio, playing music files and outputting music, displaying images and videos, playing games, receiving broadcasts, and so on.

An external device for use as a sub-display may be connected to the user terminal. In this case, the user must activate a display setting menu and manually adjust connection settings (that is, an arrangement position and/or a connection scheme (a duplication scheme or an extension scheme)) of the sub-display.

SUMMARY OF THE DISCLOSURE

Accordingly, embodiments of the present disclosure are directed to a video camera that substantially obviates one or more problems due to limitations and disadvantages of the related art.

The present disclosure is to solve such a problem, and is to provide a user terminal capable of more conveniently performing connection setting for a sub-display and a control method therefor.

Additional advantages, objects, and features of the disclosure will be set forth in the disclosure herein as well as the accompanying drawings. Such aspects may also be appreciated by those skilled in the art based on the disclosure herein.

In order to achieve the above purpose, the present disclosure may provide a user terminal including a main display, an interface unit for being connected to an external device equipped with a sub-display, and a controller that controls, in response to detection of the connection with the external device via the interface, a plurality of position icons for specifying a position of the sub-display to be displayed on the main display, and controls, in response to selection of a desired position icon among the plurality of position icons, connection setting of the sub-display to be performed based on the sub-display being disposed at a first desired position corresponding to the selected desired position icon.

The plurality of position icons may include an upper icon displayed in a first region of the main display, a left icon displayed in a second region of the main display, and a right icon displayed in a third region of the main display.

The controller may control, in response to the selection of the desired position icon, a plurality of connection scheme icons to be displayed on the main display, and control, in response to selection of a first connection scheme icon among the plurality of connection scheme icons, the connection setting of the sub-display to be performed such that the sub-display is connected to the user terminal in a first connection scheme corresponding to the first connection scheme icon.

The controller may control the plurality of connection scheme icons to be displayed in a region of the main display corresponding to the selected position icon.

The plurality of connection scheme icons may further include a second connection scheme icon for connecting the sub-display to the user terminal in a second connection scheme, and one of the first connection scheme and the second connection scheme may be an extension scheme and the other may be a duplication scheme.

The plurality of connection scheme icons may further include an icon for releasing the connection with the external device.

The controller may control, in response to selection of one of the first connection scheme icon and the second connection scheme icon, a background screen displayed on the main display to be displayed on the sub-display in the extension scheme, and control, in response to selection of the other of the first connection scheme icon and the second connection scheme icon, the background screen displayed on the main display to be displayed on the sub-display in the duplication scheme.

The controller may control, in response to selection of one desired region of the first region, the second region, and the third region of the main display after the connection setting of the sub-display is completed, a position icon corresponding to the selected desired region to be displayed among the plurality of position icons.

The controller may control, in response to the selection of the position icon corresponding to the desired region, the connection setting of the sub-display to be changed based on the sub-display being disposed at a second desired position corresponding to the selected position icon.

The controller may control, in response to selection of a fourth region of the main display after the connection setting of the sub-display is completed, a second connection scheme icon to be displayed among the plurality of connection scheme icons.

The controller may control, in response to the selection of the second connection scheme icon, the connection setting of the sub-display to be changed such that the sub-display is connected to the user terminal in a second connection scheme corresponding to the second connection scheme icon.

The controller may control the screen setting of the sub-display to be changed based on a first screen setting of the main display.

The controller may control a second screen setting of the sub-display to be received from the external device, and control the screen setting of the sub-display to be changed when the second screen setting is different from the first screen setting.

The controller may control notification graphics indicating that the change of the screen setting of the sub-display is in progress to be displayed.

The controller may control a display direction of the notification graphics to be determined based on the arrangement position of the sub-display.

The controller may control the notification graphics to move from the main display to the sub-display based on the determined display direction.

The controller may control ambient light brightness information to be received from the external device, and control the first screen setting of the main display to be determined based on the received ambient light brightness information.

The user terminal may be connected to the external device equipped with the sub-display in a wired or wireless manner.

In addition, in order to achieve the above purpose, the present disclosure may provide a method for controlling a user terminal including connecting the user terminal to an external device equipped with a sub-display, displaying, in response detection of the connection with the external device, a plurality of position icons for specifying a position of the sub-display on a main display, and performing, in response to selection of a desired position icon among the plurality of position icons, connection setting of the sub-display based on the sub-display being disposed at a first desired position corresponding to the selected desired position icon.

In addition, in order to achieve the above purpose, the present disclosure may provide a recording medium for storing a program to be executed by a user terminal, wherein the program includes an instruction for connecting the user terminal to an external device equipped with a sub-display, an instruction for displaying, in response to detection of the connection with the external device, a plurality of position icons for specifying a position of the sub-display on a main display, and an instruction for performing, in response to selection of a desired position icon among the plurality of position icons, connection setting of the sub-display based on the sub-display being disposed at a first desired position corresponding to the selected desired position icon.

In addition, in order to achieve the above purpose, the present disclosure provides a user terminal including a main display, an interface unit for being connected to an external device equipped with a sub-display, a detector for detecting an arrangement position of the sub-display, and a controller that controls connection setting related to an arrangement of the sub-display to be automatically performed based on the arrangement position of the sub-display detected via the detector.

The controller may control the detector to be activated for a predetermined time from a time point at which the external device is connected so as to detect the arrangement position of the sub-display.

The detector may include a plurality of receivers for short-range communication, and the controller may control the arrangement position of the sub-display to be detected based on a receiver signal strength indicator of a beacon signal transmitted from the external device received via the plurality of receivers for the short-range communication.

The detector may include a plurality of hall sensors, and the controller may control the arrangement position of the sub-display to be detected based on a magnetic field strength of a magnet mounted on the external device sensed via the plurality of hall sensors.

The detector may include a camera, and the controller may control the arrangement position of the sub-display to be detected based on an appearance of a user captured by the camera.

The controller may control the arrangement position of the sub-display to be detected based on at least one of captured gaze, posture, and brightness of the user.

The user terminal may be equipped with an artificial intelligence model for learning at least one of the gaze, the posture, and a behavior pattern of the user, and the controller may control the arrangement position of the sub-display to be inferred via the artificial intelligence model using the captured user.

The controller may control a plurality of users to be identified via the artificial intelligence model, control data about at least one of the gaze, the posture, and the behavior pattern to be learnt for each identified user via the artificial intelligence model, control the captured user to be identified in response to the connection of the external device, and control the arrangement position of the sub-display to be inferred via the artificial intelligence model using the data learnt for the identified user.

The controller may control data about a preferred connection scheme for each identified user to be learnt, control the captured user to be identified in response to the connection of the external device, and control connection setting of the sub-display to be performed such that the sub-display is connected in a first connection scheme that is learnt to be preferred by the identified user.

The controller may control, in response to selection of one desired region among a first region, a second region, and a third region of the main display after the connection setting of the sub-display is completed, a position icon corresponding to the selected desired region to be displayed.

The controller may control the connection setting of the sub-display to be changed based on the sub-display being disposed at a desired position corresponding to the selected icon in response to the selection of the position icon corresponding to the desired region.

The controller may control a connection scheme icon for connecting the sub-display in a second connection scheme to be displayed in response to selection of a fourth region of the main display after the connection setting of the sub-display is completed.

One of the first connection scheme and the second connection scheme may be an extension scheme and the other may be a duplication scheme.

The controller may control data about screen setting of the main display preferred by each identified user to be learnt via the artificial intelligence, control the user to be identified in response to the connection of the external device, and control the screen setting of the main display to be performed based on first screen setting learnt to be preferred by the identified user.

The controller may control second screen setting of the sub-display to be received from the external device, and control the screen setting of the sub-display to be changed when the second screen setting is different from the first screen setting.

The controller may control notification graphics indicating that the change in the screen setting of the sub-display is in progress to be displayed.

The controller may control a display direction of the notification graphics to be changed based on the arrangement position of the sub-display.

The controller may control ambient light brightness information to be received from the external device, and control the first screen setting of the main display to be changed in real time based on the received ambient light brightness information.

In addition, in order to achieve the above purpose, the present disclosure may provide a method for controlling a user terminal including connecting the user terminal to an external device equipped with a sub-display, detecting an arrangement position of the sub-display, and automatically performing connection setting related to the arrangement of the sub-display based on the arrangement position of the sub-display detected via a detector.

In addition, in order to achieve the above purpose, the present disclosure may provide a recording medium for storing a program to be executed by a user terminal, wherein the program includes an instruction for connecting the user terminal to an external device equipped with a sub-display, an instruction for detecting an arrangement position of the sub-display, and an instruction for automatically performing connection setting related to arrangement of the sub-display based on the arrangement position of the sub-display detected via a detector.

An effect of the user terminal to which the external display may be connected and the control method therefor according to the present disclosure will be described as follows.

According to at least one of the embodiments of the present disclosure, there is an advantage that the connection setting for the sub-display may be performed more conveniently.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

The present invention will become more fully understood from the detailed description given herein below and the accompanying drawings, which are given by illustration only, and thus are not limitative of the present invention.

FIG. 34 shows a user terminal and an external display connected to each other according to FIG. 33.

DETAILED DESCRIPTION OF THE DISCLOSURE

Figure 1:
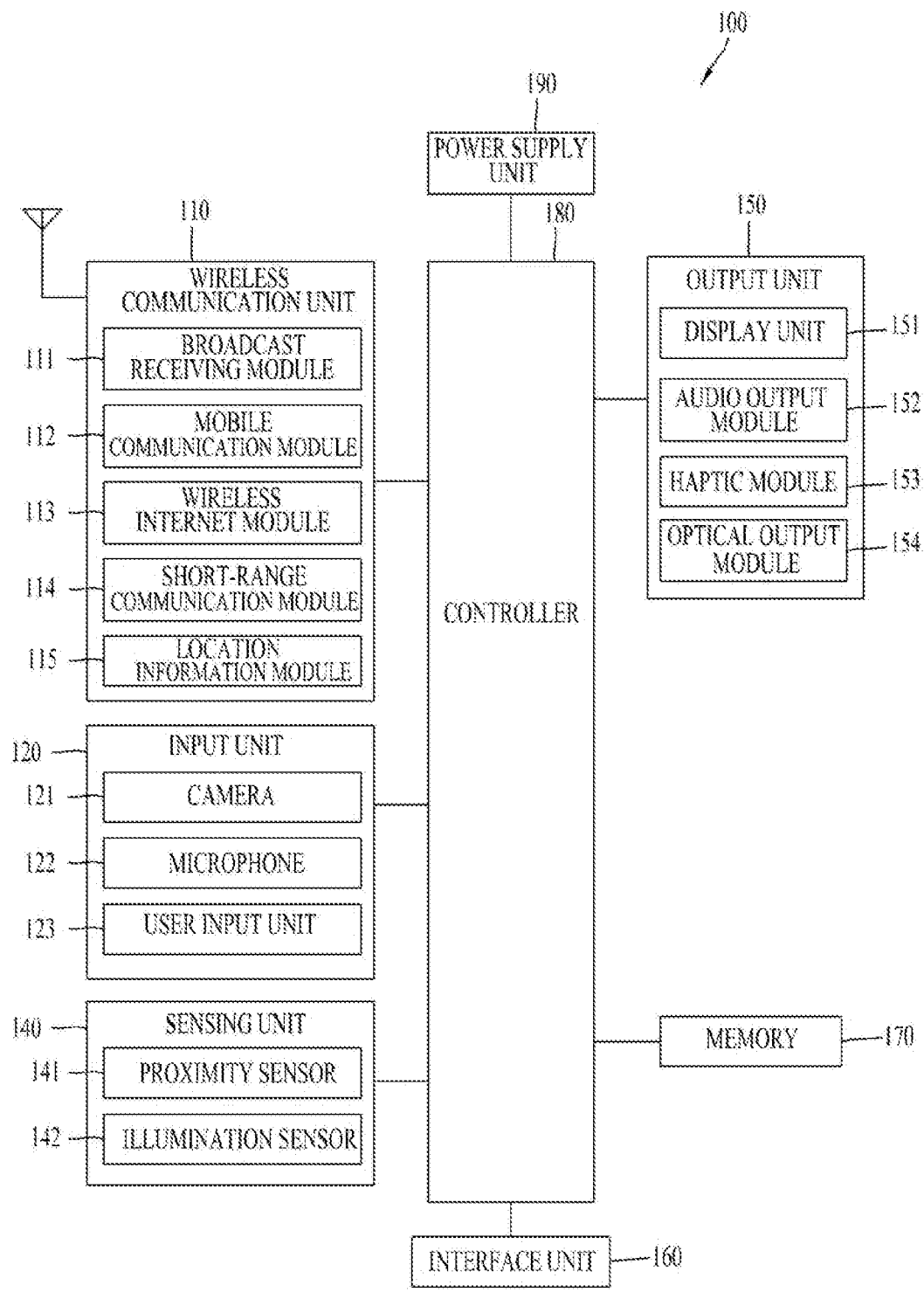
FIG. 1 is a schematic block diagram of a user terminal related to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Each of these components may be configured as a separate individual hardware module or implemented as two or more hardware modules. Two or more components may be implemented as a single hardware module. In some cases, at least one of these components may be implemented as software.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

In this disclosure, the expression "at least one of A or B" may mean "A", "B", or "A and B".

User terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of user terminals. However, such teachings apply equally to other types of terminals, such as those types noted above. In addition, these teachings may also be applied to stationary terminals such as digital TV, desktop computers, digital signages, and the like.

Reference is now made to FIG. 1, which is a block diagram of a user terminal in accordance with the present disclosure.

The user terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the user terminal 100 is shown having wireless communication unit 110 configured with several commonly implemented components. For instance, the wireless communication unit 110 typically includes one or more components which permit wireless communication between the user terminal 100 and a wireless communication system or network within which the user terminal is located.

The wireless communication unit 110 typically includes one or more modules which permit communications such as wireless communications between the user terminal 100 and a wireless communication system, communications between the user terminal 100 and another user terminal, communications between the user terminal 100 and an external server. Further, the wireless communication unit 110 typically includes one or more modules which connect the user terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the user terminal, the surrounding environment of the user terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The user terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the user terminal 100 and a user, as well as function as the user input unit 123 which provides an input interface between the user terminal 100 and the user.

The interface unit 160 serves as an interface with various types of external devices that can be coupled to the user terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the user terminal 100 may perform assorted control functions associated with a connected external device, in response to the external device being connected to the interface unit 160.

The memory 170 is typically implemented to store data to support various functions or features of the user terminal 100. For instance, the memory 170 may be configured to store application programs executed in the user terminal 100, data or instructions for operations of the user terminal 100, and the like. Some of these application programs may be downloaded from an external server via wireless communication. Other application programs may be installed within the user terminal 100 at time of manufacturing or shipping, which is typically the case for basic functions of the user terminal 100 (for example, receiving a call, placing a call, receiving a message, sending a message, and the like). It is common for application programs to be stored in the memory 170, installed in the user terminal 100, and executed by the controller 180 to perform an operation (or function) for the user terminal 100.

The controller 180 typically functions to control overall operation of the user terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the user terminal 100. The power supply unit 190 may include a battery, and the battery may be configured to be embedded in the terminal body, or configured to be detachable from the terminal body.

At least some of the components may operate in cooperation with each other to implement an operation, control, or a control method of the user terminal according to various embodiments to be described below. In addition, the operation, the control, or the control method of the user terminal may be implemented on the user terminal by driving at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the user terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external user terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), 5G, and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the user terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A, 5G and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the user terminal 100 and a wireless communication system, communications between the user terminal 100 and another user terminal 100, or communications between the user terminal and a network where another user terminal 100 (or an external server) is located, via wireless area networks. One example of the wireless area networks is a wireless personal area networks.

In some embodiments, another user terminal (which may be configured similarly to user terminal 100) may be a wearable device, for example, a smart watch, a smart glass or a head mounted display (HMD), which is able to exchange data with the user terminal 100 (or otherwise cooperate with the user terminal 100). The short-range communication module 114 may sense or recognize the wearable device, and permit communication between the wearable device and the user terminal 100. In addition, when the sensed wearable device is a device which is authenticated to communicate with the user terminal 100, the controller 180, for example, may cause transmission of data processed in the user terminal 100 to the wearable device via the short-range communication module 114. Hence, a user of the wearable device may use the data processed in the user terminal 100 on the wearable device. For example, when a call is received in the user terminal 100, the user may answer the call using the wearable device. Also, when a message is received in the user terminal 100, the user can check the received message using the wearable device.

The location information module 115 is generally configured to detect, calculate, derive or otherwise identify a position of the user terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the user terminal. As one example, when the user terminal uses a GPS module, a position of the user terminal may be acquired using a signal sent from a GPS satellite. As another example, when the user terminal uses the Wi-Fi module, a position of the user terminal can be acquired based on information related to a wireless access point (AP) which transmits or receives a wireless signal to or from the Wi-Fi module.

The input unit 120 may be configured to permit various types of input to the user terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the user terminal 100. As another example, the cameras 121 may be located in a stereoscopic arrangement to acquire left and right images for implementing a stereoscopic image. The plurality of cameras 121 may include a depth camera and/or a time of flight (TOF) camera for three-dimensionally sensing a subject.

The microphone 122 is generally implemented to permit audio input to the user terminal 100. The audio input can be processed in various manners according to a function being executed in the user terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the user terminal 100. The user input unit 123 may include one or more of a mechanical input element (for example, a key, a button located on a front and/or rear surface or a side surface of the user terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the user terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the user terminal, surrounding environment information of the user terminal, user information, or the like. The controller 180 generally cooperates with the sending unit 140 to control operation of the user terminal 100 or execute data processing, a function or an operation associated with an application program installed in the user terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the user terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the user terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the user terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the user terminal 100. For example, the display unit 151 may display execution screen information of an application program executing at the user terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the user terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the user terminal 100.

An optical output module 154 can output a signal for indicating an event generation using light of a light source. Examples of events generated in the user terminal 100 may include message reception, call signal reception, a missed call, an alarm, a schedule notice, an email reception, information reception through an application, and the like.

A signal output by the optical output module 154 may be implemented in such a manner that the user terminal emits monochromatic light or light with a plurality of colors. The signal output may be terminated as the user terminal senses that a user has checked the generated event, for example.

The interface unit 160 serves as an interface for external devices to be connected with the user terminal 100. For example, the interface unit 160 can receive data transmitted from an external device, receive power to transfer to elements and components within the user terminal 100, or transmit internal data of the user terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the user terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the user terminal 100 is connected with an external cradle, the interface unit 160 can serve as a passage to allow power from the cradle to be supplied to the user terminal 100 or may serve as a passage to allow various command signals input by the user from the cradle to be transferred to the user terminal there through. Various command signals or power input from the cradle may operate as signals for recognizing that the user terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The user terminal 100 may also be operated in relation to a network storage device that performs the storage function of the memory 170 over a network, such as the Internet.

The controller 180 may typically control the general operations of the user terminal 100. For example, the controller 180 may set or release a lock state for restricting a user from inputting a control command with respect to applications when a status of the user terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the user terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, an artificial intelligence (AI) that may be utilized in the present disclosure will be described.

Artificial Intelligence (AI) refers to a field that studies artificial intelligence or methodology capable of achieving artificial intelligence. Machine learning refers to a field that defines various problems handled in the AI field and studies methodology for solving the problems. Machine learning may also be defined as an algorithm for raising performance for any task through steady experience of the task.

An artificial neural network (ANN) may refer to a model in general having problem solving capabilities, that is composed of artificial neurons (nodes) constituting a network by a combination of synapses, as a model used in machine learning. The ANN may be defined by a connection pattern between neurons of different layers, a learning process of updating model parameters, and/or an activation function for generating an output value.

The ANN may include an input layer, an output layer, and, optionally, one or more hidden layers. Each layer includes one or more neurons and the ANN may include a synapse connecting neurons. In the ANN, each neuron may output input signals, which are input through the synapse, weights, and function values of an activation function for deflection.

A model parameter refers to a parameter determined through learning and includes a weight of synaptic connection and a deflection of a neuron. A hyperparameter refers to a parameter that should be configured before learning in a machine learning algorithm and includes a learning rate, the number of repetitions, a mini batch size, an initialization function, and the like.

The purpose of learning of the ANN may be understood as determining the model parameter that minimizes a loss function. The loss function may be used as an index to determine an optimal model parameter in a learning process of the ANN.

Machine learning may be classified into supervised learning, unsupervised learning, and reinforcement learning, according to a learning scheme.

Supervised learning refers to a method of training the ANN in a state in which a label for training data is given. The label may represent a correct answer (or result value) that the ANN should infer when the training data is input to the ANN. Unsupervised learning may refer to a method of training the ANN in a state in which the label for the training data is not given. Reinforcement learning may refer to a learning method in which an agent defined in a certain environment is trained to select a behavior or a behavior order that maximizes accumulative compensation in each state.

Among ANNs, machine learning implemented as a deep neural network (DNN) including a plurality of hidden layers is also called deep learning. Deep learning is a part of machine learning. Hereinbelow, machine learning includes deep learning.

An object detection model using machine learning includes a you only look once (YOLO) model of a single-step scheme, a faster regions with convolution neural networks (R-CNN) model of a two-step scheme, and the like.

The you only look once (YOLO) model is a model in which an object existing in an image and a position of the corresponding object may be predicted as the image is viewed only once.

The you only look once (YOLO) model divides the original image into grids of the same size. Then, for each grid, the number of bounding boxes specified in a predefined form around a center of the grid is predicted, and reliability is calculated based on the predicted number.

Thereafter, whether the image contains the object or contains only a background may be included, and a location with high object reliability may be selected, so that an object category may be identified.

The faster regions with convolution neural networks (R-CNN) model is a model that may detect the object faster than an RCNN model and a Fast RCNN model.

The faster regions with convolution neural networks (R-CNN) model will be described in detail.

First, a feature map is extracted from the image via a convolution neural network (CNN) model. Based on the extracted feature map, a plurality of regions of interest (RoIs) are extracted. RoI pooling is performed for each region of interest.

The RoI pooling is a process of setting grids of a feature map to which the regions of interest are projected to fit a H×W size that is determined in advance and extracting the greatest value for each cell included in each grid to extract a feature map having the H×W size.

A feature vector may be extracted from the feature map having the H×W size, and identification information of the object may be obtained from the feature vector.

Hereinafter, with reference to FIG. 1, the user terminal being used as an AI device will be described.

The wireless communication unit 110 may transmit/receive data to and from external devices such as another AI device, an AI server, or the like using a wireless communication technology. For example, the wireless communication unit 110 may transmit/receive sensor information, a user input, a learning model, a control signal, and the like to and from the external devices.

The input unit 120 may acquire various types of data.

In this regard, because the camera 121 or the microphone 122 of the input unit 120 may be treated as a sensor, a signal obtained from the camera or the microphone may be referred to as sensing data or the sensor information.

The input unit 120 may acquire learning data for model learning, input data to be used when acquiring an output using the learning model, and the like. The input unit 120 may acquire raw input data, and in this case, the controller 180 may extract an input feature as a pre-processing for the input data.

The controller 180 may include a learning processor (not shown) for training a model composed of an artificial neural network using the learning data. The learning processor may be constructed as a component separate from the controller 180.

In this regard, the trained artificial neural network may be referred to as the learning model. The learning model may be used to infer a result value with respect to new input data other than the learning data, and the inferred value may be used as a basis for determination to perform a certain operation.

In this regard, the learning processor may perform AI processing.

The sensing unit 140 may acquire at least one of interior information of the user terminal 100, surrounding environment information of the user terminal 100, and user information using various sensors.

In this regard, the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and the like.

The memory 170 may store the input data, the learning data, the learning model, a learning history, and the like obtained from the input unit 120.

The controller 180 may determine at least one executable operation of the user terminal 100 based on information determined or generated using a data analysis algorithm or a machine learning algorithm.

To this end, the controller 180 may request, search, receive, or utilize the data of the learning processor or the memory 170, and may control components of the user terminal 100 to execute a predicted operation or an operation determined to be desirable among the at least one executable operation.

In this regard, when connection of an external device is required to perform the determined operation, the controller 180 may generate a control signal for controlling the corresponding external device and transmit the generated control signal to the corresponding external device.

The controller 180 may obtain intention information with respect to the user input, and determine a requirement of the user based on the obtained intention information.

In this regard, the controller 180 may obtain the intention information corresponding to the user input using at least one of a speech to text (STT) engine for converting a speech input into a character string and a natural language processing (NLP) engine for obtaining intention information of a natural language.

In this regard, at least one of the STT engine and the NLP engine may be composed of the artificial neural network, at least a portion of which is trained based on the machine learning algorithm. In addition, at least one of the STT engine and the NLP engine may be trained by the learning processor, may be trained by a learning processor of an external AI server, or may be trained by distributed processing thereof.

The controller 180 may collect history information including a user's feedback on an operation content or ana operation of the user terminal 100, and store the history information in the memory 170 or the learning processor 130 or transmit the history information to the external device such as the AI server. The collected history information may be used to update the learning model.

Hereinafter, connection of the user terminal 100 constructed to the external display will be described with further reference to FIGS. 2 to 5.

Figure 2:
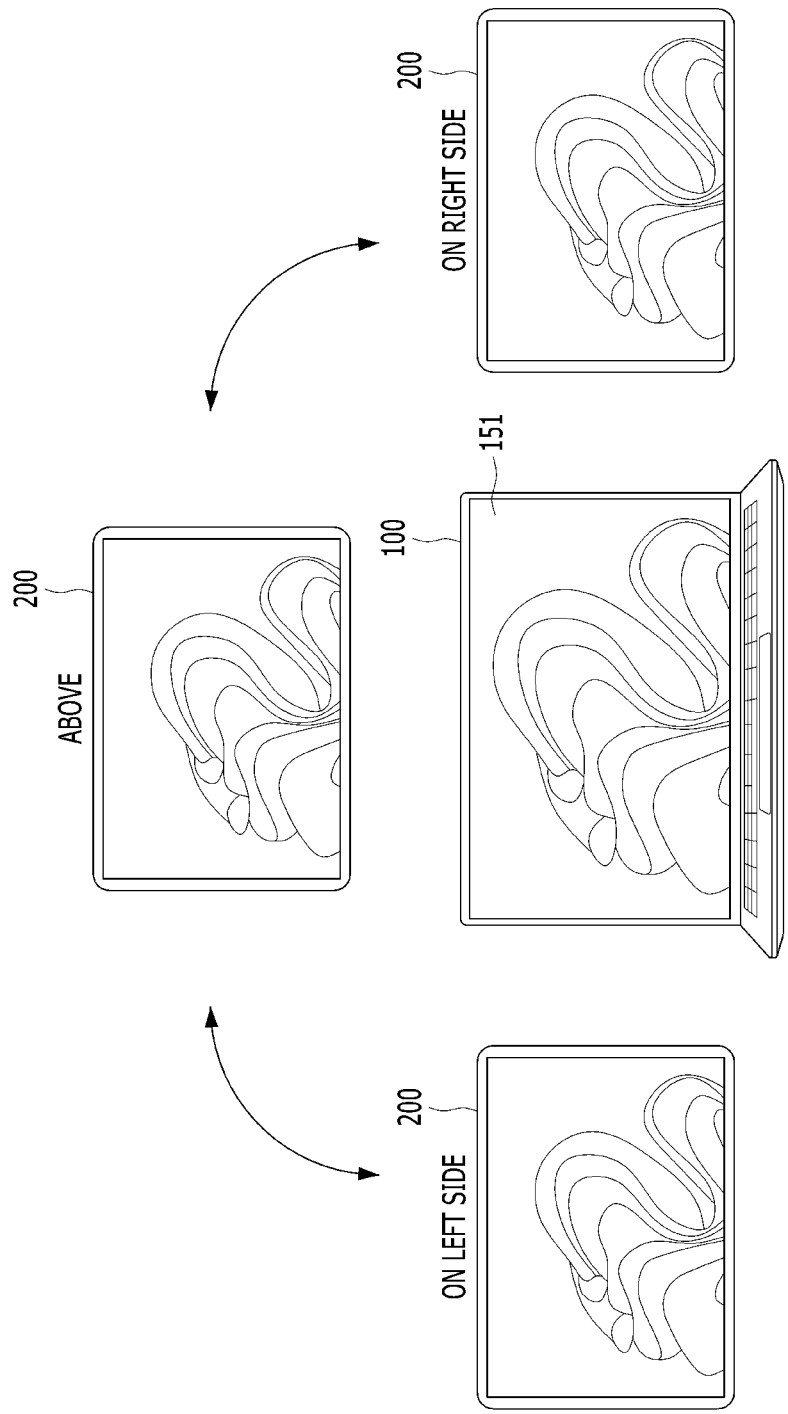
FIGS. 2 to 4 show a user terminal and an external display connected to each other according to the prior art.
Figure 3:
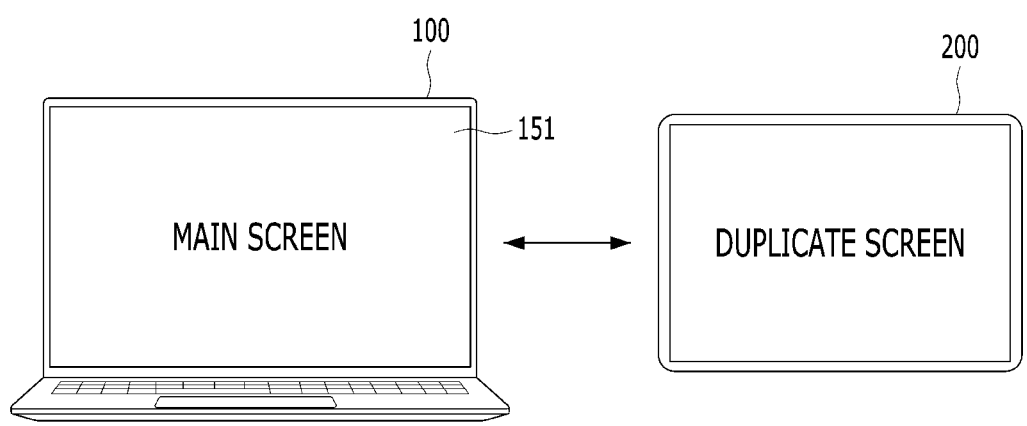
Figure 4:
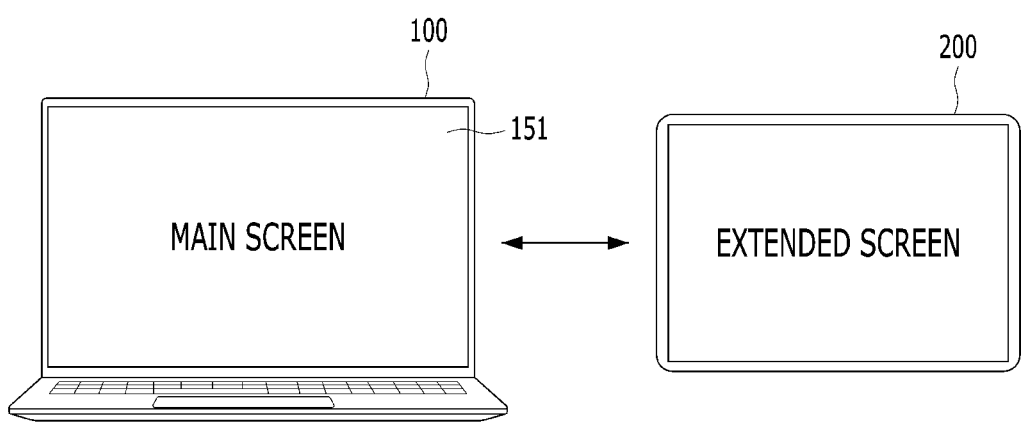
Figure 5:
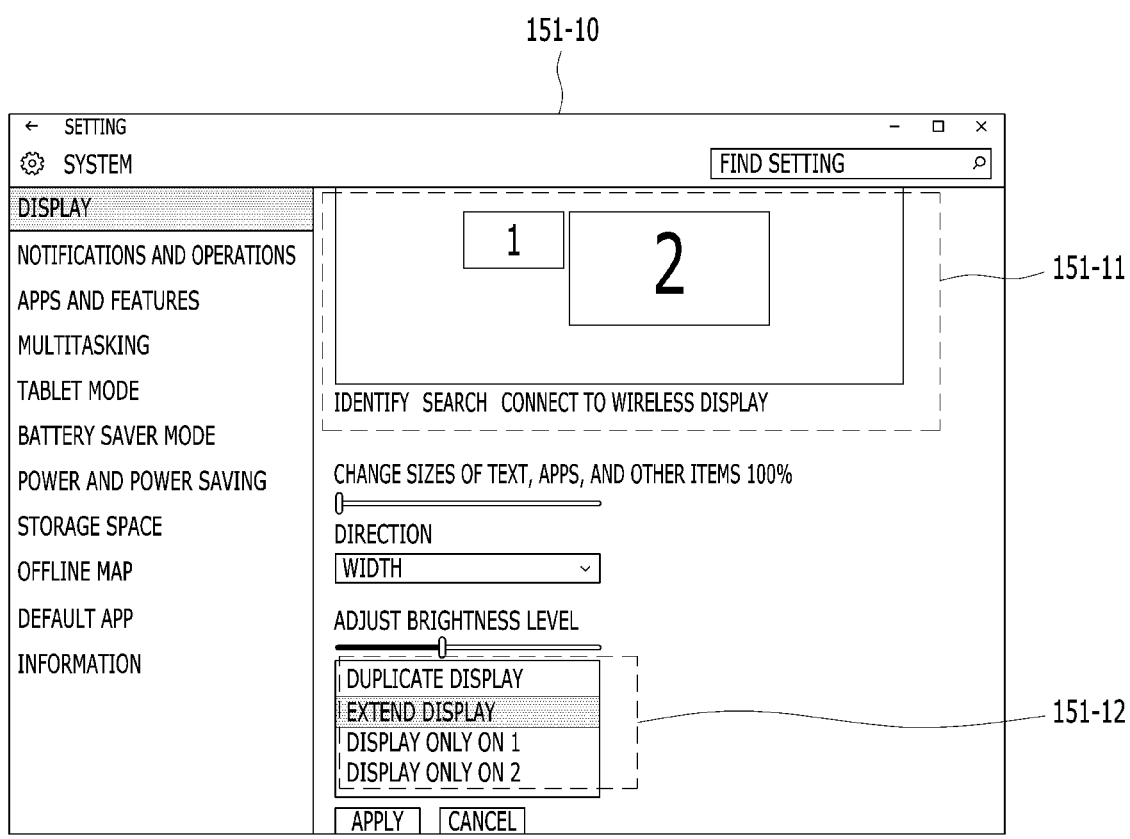
FIG. 5 shows a display setting screen for connecting an external display to a user terminal according to the prior art.

FIGS. 2 to 4 show a user terminal and an external display connected to each other according to the prior art, and FIG. 5 shows a display setting screen for connecting an external display to a user terminal according to the prior art.

The user terminal 100 may be connected to an external display 200. In this regard, the external display 200 may be understood as an external device 200 having a separate display.

Hereinafter, for convenience of illustration, the display unit 151 of the user terminal 100 will be referred to as a main display, and the external device itself 200 or a separate display 200 disposed in the external device will also be referred to as a sub-display.

The sub-display 200 may be another user terminal 100 or a dedicated monitor for display.

The user terminal 100 may be connected to the sub-display 200 in a wired manner via the interface unit 160, or may be connected to the sub-display 200 in a wireless manner via the wireless communication unit 110.

The scheme in which the user terminal 100 and the sub-display 200 are connected to each other in the wired manner may be, for example, one of a HDMI scheme, a USB scheme, a thunderbolt scheme, and the like (not limited thereto).

The scheme in which the user terminal 100 and the sub-display 200 are connected to each other in the wireless manner may be, for example, one of a Bluetooth scheme, an ultra-wideband (UWB) scheme, a Miracast scheme, an Air Play scheme, and the like (not limited thereto).

The user terminal 100 may display a display content via the main display 151 and the sub-display 200 connected to the user terminal 100.

As shown in FIG. 2, the user may place the sub-display 200 connected to the user terminal 100 at one desired position among various positions around the user terminal 100. In FIG. 2, the various positions around the user terminal 100 are illustrated as positions on a right side of, on a left side of, and above the user terminal 100, but the present disclosure is not limited thereto.

When placing the sub-display 200 at the desired position, as shown in FIG. 5, the user may need to activate a display setting menu 151-10 of the user terminal 100 and specify the position of the sub-display 200 to correspond to the desired position via a display arrangement detailed menu 151-11. Then, display graphic association (e.g., a mouse movement) between the main display 151 and the sub-display 200 may be natural.

In one example, as shown in FIG. 3, the user may desire to display a duplicate screen that copies the display content displayed on the main display 151 on the sub-display 200.

Alternatively, as shown in FIG. 4, the user may desire to display an extended screen that extends the display content displayed on the main display 151 on the sub-display 200.

In order to display the display content on the sub-display 200 based on the desire thereof, as shown in FIG. 5, the user may need to activate the display setting menu 151-10 of the user terminal 100, and specify or set a connection scheme (e.g., a duplicate screen scheme or an extended screen scheme) of the sub-display 200 via a display connection scheme detailed menu 151-12.

When desired to connect the external display 200 to the user terminal 100 and use the external display 200 as the sub-display as such, the user may need to activate the display setting menu 151-10 and specify the arrangement position of the sub-display 200 and specify the connection scheme of the sub-display 200. This may cause inconvenience to the user.

Figure 6:
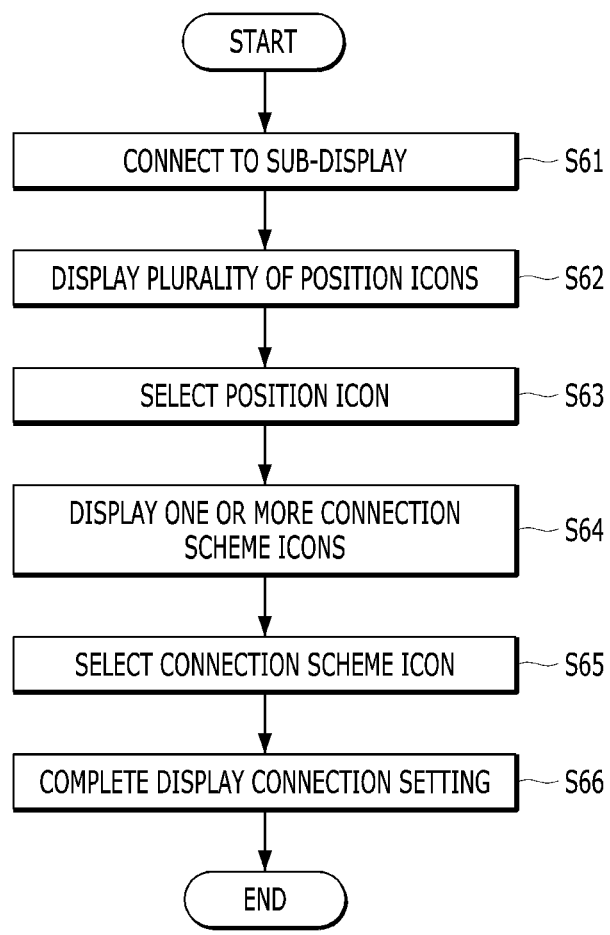
FIG. 6 shows a flowchart for connecting an external display to a user terminal according to an embodiment of the present disclosure.

Hereinafter, with reference to FIGS. 6 to 10, the user terminal being connected to the external display according to an embodiment of the present disclosure will be described. FIG. 6 shows a flowchart for connecting an external display to a user terminal according to an embodiment of the present disclosure, and FIGS. 7 to 10 show a user terminal and an external display connected to each other according to FIG. 6.

The external display 200 may be connected to the user terminal 100 in the wired or wireless manner as the sub-display [S61].

Figure 7:
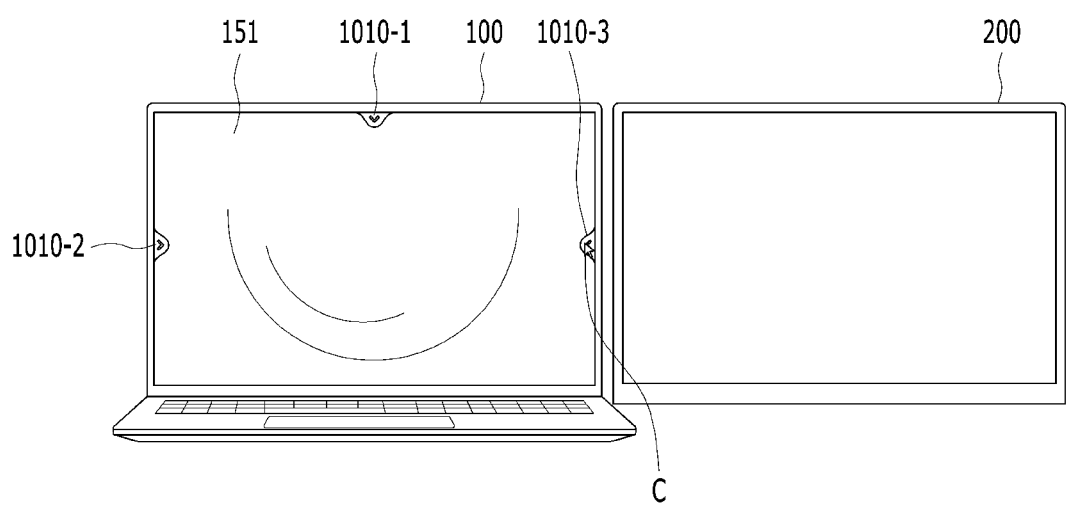
FIGS. 7 to 10 show a user terminal and an external display connected to each other according to FIG. 6.

When it is detected that the sub-display 200 is connected to the user terminal 100, as shown in FIG. 7, the controller 180 control a plurality of position icons 1010-1, 1010-2, and 1010-3 for specifying the position of the sub-display 200 to be displayed on the main display 151 [S62].

The plurality of position icons are illustrated as including an upper icon 1010-1, a left icon 1010-2, and a right icon 1010-3, but the present disclosure is not limited thereto. The upper icon 1010-1 is displayed in an upper region of the main display 151 so as to specify that the sub-display 200 is disposed above the user terminal 100. The left icon 1010-2 is displayed in a left region of the main display 151 so as to specify that the sub-display 200 is disposed on the left side of the user terminal 100. The right icon 1010-3 is displayed in a right region of the main display 151 so as to specify that the sub-display 200 is disposed on the right side of the user terminal 100. The user may intuitively select one of the upper icon 1010-1, the left icon 1010-2, and the right icon 1010-3 so as to correspond to the position of the sub-display 200. In this regard, the upper region, the left region, and the right region, and the upper icon, the left icon, and the right icon respectively corresponding thereto are illustrative only. In one example, a region different from those and a position icon corresponding to the region may be defined.

As shown in FIGS. 7 to 10, because the sub-display 200 is positioned on the right side of the user terminal 100, the user may select the right icon 1010-3 to specify the position (or a direction) of the sub-display 200 [S63].

The selection of the right icon 1010-3 may be performed by moving a mouse cursor (or a pointer) C to the right icon 1010-3 and then clicking a mouse on the right icon 1010-3. In one example, when the main display 151 is formed as a touch screen, the right icon 1010-3 may be selected via touching. In one example, this also applies to selection of other icons or graphics in the present disclosure.

Although not shown, when the sub-display 200 is positioned above or on the left side of the user terminal 100, the user may specify the position of the sub-display 200 by selecting the upper icon 1010-1 or the left icon 1010-2.

Figure 8:
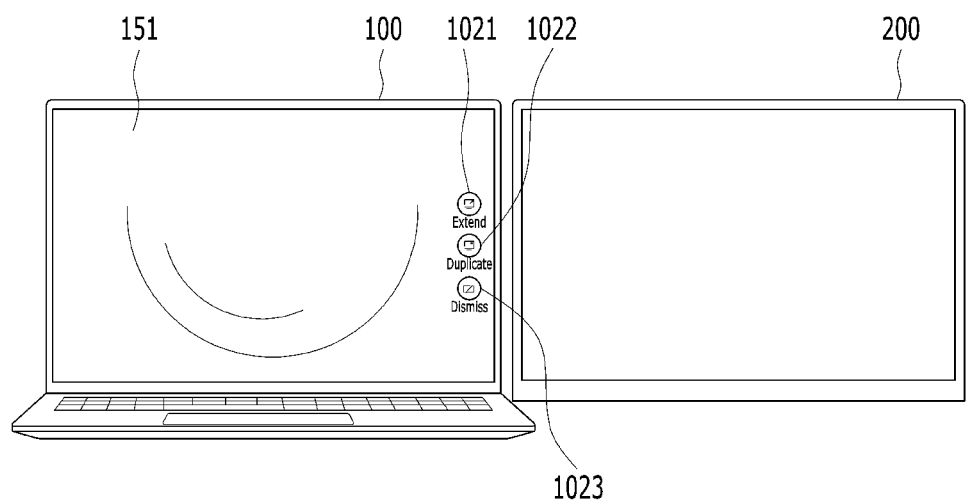

When the right icon 1010-3 is selected, as shown in FIG. 8, the controller 180 may display one or more connection scheme icons 1021, 1022, and 1023 for specifying the connection scheme in the right region of the main display 151 corresponding to the right icon 1010-3 [S64]. At this time, the upper icon 1010-1, the left icon 1010-2, and the right icon 1010-3 may no longer be displayed.

Although not shown, the displayed one or more connection scheme icons may include a display setting icon (not shown) for calling the display setting menu 151-10 shown in FIG. 5. However, when there is a past setting history related to past connection of the sub-display 200 to the user terminal 100, the display setting icon may not be displayed.

Although not shown, when the upper icon 1010-1 is selected, the one or more connection scheme icons may be displayed in the upper region of the main display 151 corresponding to the upper icon 1010-1, and when the left icon 1010-2 is selected, the one or more connection scheme icons may be displayed in the left region of the main display 151 corresponding to the left icon 1010-2.

It is illustrated in FIGS. 7 and 8 that, although the user terminal 100 and the sub-display 200 are connected to each other, nothing is being displayed on the sub-display 200 yet. This may be because display connection setting has not been completed yet.

However, the present disclosure is not limited thereto. For example, when the external display 200 has a history of being connected to the user terminal 100 in the past, the past connection history may be stored in the user terminal 100. Accordingly, even when the display connection setting to be described below has not been completed, the image output from the user terminal 100 may be displayed on the external display 200 based on the past connection history. When the external display 200 has no history of being connected to the user terminal 100 in the past, the image output from the user terminal 100 may be displayed on the external display 200 based on preset default display connection setting. Regardless of whether the external display 200 has the history of being connected to the user terminal 100 in the past, the image output from the user terminal 100 may be displayed on the external display 200 based on the preset default display connection setting.

It is illustrated in FIG. 8 that, as the one or more connection scheme icons, a first connection scheme icon 1021 for using the sub-display 200 in the extension scheme, a second connection scheme icon 1022 for using the sub-display 200 in the duplication scheme, and a third connection scheme icon 1023 for releasing the connection with the sub-display 300 are displayed.

However, the controller 180 does not necessarily display all of the first to third connection scheme icons 1021, 1022, and 1023 on the main display 151 in response to the selection of the right icon 1010-3. For example, the third connection scheme icon 1023-3 may not be displayed on the main display 151 in response to the selection of the right icon 1010-3. Alternatively, based on the past connection history or the preset default display connection setting, when the output image of the user terminal 100 is displayed on the sub-display 200 in the extended scheme, the first connection scheme icon 1021 may not be displayed. Alternatively, based on the past connection history or the preset default display connection setting, when the output image of the user terminal 100 is being displayed on the sub-display 200 in the duplication scheme, the second connection scheme icon 1022 may not be displayed.

In addition, the controller 180 does not necessarily display all of the first to third connection scheme icons 1021, 1022, and 1023 in the right region of the main display 151 in response to the selection of the right icon 1010-3. For example, the third connection scheme icon 1023-3 may be displayed in another region of the main display 151 (e.g., a lower region of the main display 151) in response to the selection of the right icon 1010-3.

Figure 9:
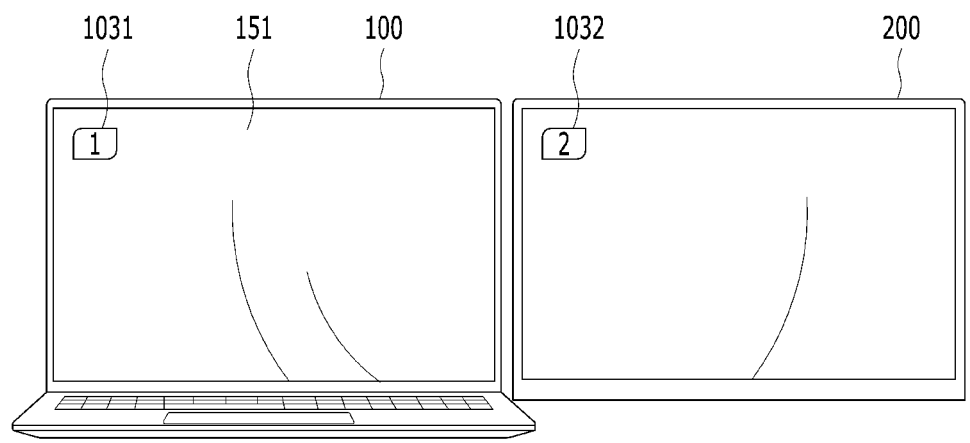

When the first connection scheme icon 1021 is selected, as shown in FIG. 9, the controller 180 may perform connection setting of the sub-display 200 such that the sub-display 200 is connected in the extension scheme while recognizing that the sub-display 200 is disposed on the right side of the user terminal 100 [S65 and S66]. That is, the controller 180 may specify or set the connection scheme of the sub-display 200 as the extension scheme in response to the selection of the first connection scheme icon 1021 while specifying or setting that the sub-display 200 is disposed on the right side of the user terminal 100 in response to the selection of the right icon 1010-3.

It is illustrated in FIG. 9 that a background screen that has been displayed on the main display 151 is extended in a right direction and displayed on the sub-display 200. Accordingly, the user may intuitively understand that the sub-display 200 is disposed on the right side of the user terminal 100 and connected to the user terminal 100 in the extension scheme while viewing the background screen. Because the sub-display 200 is displayed in the extension scheme, when an app is executed in the user terminal 100 and an execution screen window (not shown) of the app is displayed on the background screen of the main display 151, the execution screen window may be displayed while being extended in the right direction up to the sub-display 200. For example, the execution screen window may be displayed by moving in the right direction from the main display 151 to the sub-display 200 or extending to the sub-display 200.

However, even when the sub-display 200 is connected to the user terminal 100 in the extension scheme, the background screen does not necessarily have to be extended and displayed on the sub-display 200. For example, a background screen displayed on the sub-display 200 may be a duplicate of the background screen displayed on the main display 151. However, because the sub-display 200 is displayed in the extension scheme, the execution screen window of the app may be displayed while being extended in the right direction up to the sub-display 200.

In addition, when the first connection scheme icon 1021 is selected and the sub-display 200 is connected, as shown in FIG. 9, the controller 180 may control a main icon 1031 indicating that the display 151 of the user terminal 100 is the main display to be displayed on the main display 151, and control a sub-icon 1032 indicating that the external display 200 is the sub-display to be displayed on the sub-display 200.

The main icon 1031 and the sub-icon 132 may not be necessarily displayed, and may not be displayed although the first connection scheme icon 1021 is selected and the sub-display 200 is connected.

The controller 180 may control the main icon 1031 and the sub-icon 132 to disappear automatically when a predetermined time (e.g., 2 seconds) elapses after being displayed.

Figure 10:
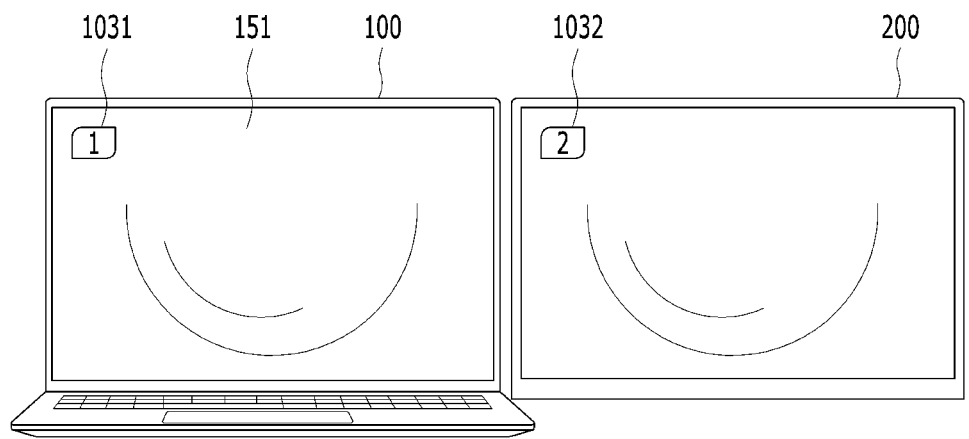

In one example, when the second connection scheme icon 1022 is selected, as shown in FIG. 10, the controller 180 may connect the sub-display 200 in the duplication scheme [S65 and S66]. That is, the controller 180 may specify or set the connection scheme of the sub-display 200 as the duplication scheme.

It is illustrated in FIG. 10 that the background screen that has been displayed on the main display 151 is duplicated and displayed on the sub-display 200. Accordingly, the user may intuitively understand that the sub-display 200 is connected to the user terminal 100 in the duplication scheme while viewing the background screen. Because the sub-display 200 is displayed in the duplication scheme, when the app is executed in the user terminal 100 and the execution screen window (not shown) of the app is displayed on the background screen of the main display 151, the execution screen window may be duplicated and displayed on the sub-display 200.

In addition, when the second connection scheme icon 1022 is selected and the sub-display 200 is connected, as shown in FIG. 10, the controller 180 may control the main icon 1031 indicating that the display 151 of the user terminal 100 is the main display to be displayed on the main display 151, and control the sub-icon 1032 indicating that the external display 200 is the sub-display to be displayed on the sub-display 200.

The main icon 1031 and the sub-icon 132 may not be necessarily displayed, and may not be displayed even when the second connection scheme icon 1022 is selected and the sub-display 200 is connected.

The controller 180 may control the main icon 1031 and the sub-icon 132 to disappear automatically when the predetermined time (e.g., 2 seconds) elapses after being displayed.

In one example, when the third connection scheme icon 1023 is selected, the controller 180 may release the communication connection between the user terminal 100 and the sub-display 200. That is, the third connection scheme icon 1023 may be understood as an icon for releasing the communication connection between the user terminal 100 and the sub-display 200.

Figure 11:
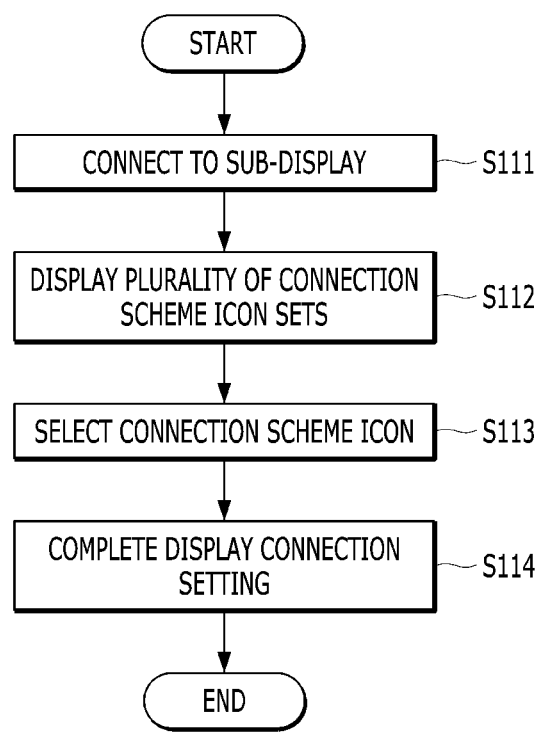
FIG. 11 shows a flowchart for connecting an external display to a user terminal according to an embodiment of the present disclosure.

Hereinabove, it has been described that, when the sub-display 200 is connected to the user terminal 100 [S61], the plurality of position icons 1010-1, 1010-2, and 1010-3 are displayed [S62], and when one position icon is selected among them [S63], the one or more connection scheme icons corresponding to the selected position icon are displayed [S64]. However, the present disclosure is not limited thereto. For example, the plurality of position icons are not necessarily displayed. This will be described with further reference to FIGS. 11 and 12. FIG. 11 shows a flowchart for connecting an external display to a user terminal according to an embodiment of the present disclosure, and FIG. 12 shows a user terminal and an external display connected to each other according to FIG. 7.

The external display 200 may be connected to the user terminal 100 as the sub-display in the wired or wireless communication manner [S111].

Figure 12:
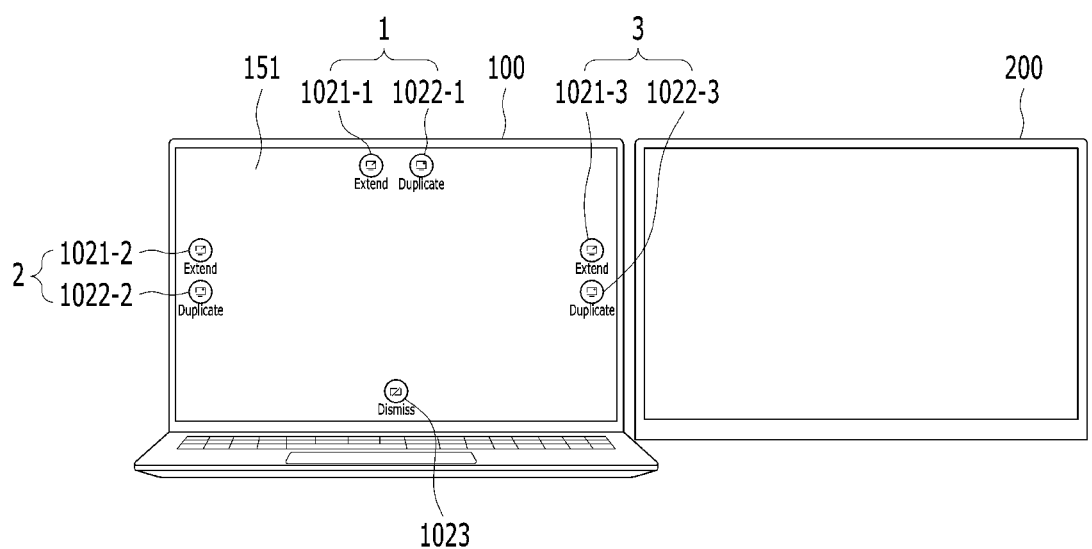
FIG. 12 shows a user terminal and an external display connected to each other according to FIG. 7.

When it is detected that the sub-display 200 is connected to the user terminal 100, the controller 180 may control a plurality of connection scheme icon sets for specifying the position and the connection scheme of the sub-display 200 to be displayed on the main display 151 as shown in FIG. 12 [S112].

It is illustrated in FIG. 12 that three sets, that is, a first set 1, a second set 2, and a third set 3 are displayed. The first set 1 corresponds to the upper icon 1010-1, and is illustrated to include a first connection scheme icon 1021-1 and a second connection scheme icon 1022-1 for the first set. The second set 2 corresponds to the left icon 1010-2, and is illustrated to include a first connection scheme icon 1021-2 and a second connection scheme icon 1022-2 for the second set. The third set 3 corresponds to the right icon 1010-3, and is illustrated to include a first connection scheme icon 1021-3 and a second connection scheme icon 1022-3 for the third set. In addition, it is illustrated in FIG. 12 that, in addition to the first set 1, the second set 2, and the third set 3, the communication connection release icon 1023 is displayed. The communication connection release icon 1023 may not be displayed.

Selection of one of the first connection scheme icon 1021-1 and the second connection scheme icon 1022-1 in the first set 1 may serve as the same role as the selection of the upper icon 1010-1. That is, by selecting one of the first connection scheme icon 1021-1 and the second connection scheme icon 1022-1 in the first set 1 [S113], while specifying that the sub-display 200 is disposed above the user terminal 100, the user may specify that the sub-display 200 is used in one of the extension scheme and the duplication scheme so as to quickly complete the connection setting of the sub-display 200 [S114]. That is, when the first connection scheme icon 1021-1 of the first set 1 is selected, while specifying that the sub-display 200 is disposed above the user terminal 100, it may be specified that the sub-display 200 is used in the extension scheme. In addition, when the second connection scheme icon 1022-1 of the first set 1 is selected, while specifying that the sub-display 200 is disposed above the user terminal 100, it may be specified that the sub-display 200 is used in the duplication scheme. One of the first connection scheme icon 1021-1 and the second connection scheme icon 1022-1 of the first set 1 may not be displayed based on the past connection history or the preset default display connection setting, which is as described above.

Selection of one of the first connection scheme icon 1021-2 and the second connection scheme icon 1022-2 in the second set 2 may serve as the same role as the selection of the left icon 1010-2. That is, by selecting one of the first connection scheme icon 1021-2 and the second connection scheme icon 1022-2 in the second set 2 [S113], while specifying that the sub-display 200 is disposed on the left side of the user terminal 100, the user may specify that the sub-display 200 is used in one of the extension scheme and the duplication scheme so as to quickly complete the connection setting of the sub-display 200 [S114]. That is, when the first connection scheme icon 1021-2 of the second set 2 is selected, while specifying that the sub-display 200 is disposed on the left side of the user terminal 100, it may be specified that the sub-display 200 is used in the extension scheme. In addition, when the second connection scheme icon 1022-2 of the second set 2 is selected, while specifying that the sub-display 200 is disposed on the left side of the user terminal 100, it may be specified that the sub-display 200 is used in the duplication scheme. One of the first connection scheme icon 1021-2 and the second connection scheme icon 1022-2 of the second set 2 may not be displayed based on the past connection history or the preset default display connection setting, which is as described above.

Selection of one of the first connection scheme icon 1021-3 and the second connection scheme icon 1022-3 in the third set 3 may serve as the same role as the selection of the right icon 1010-3. That is, by selecting one of the first connection scheme icon 1021-3 and the second connection scheme icon 1022-3 in the third set 3 [S113], while specifying that the sub-display 200 is disposed on the right side of the user terminal 100, the user may specify that the sub-display 200 is used in one of the extension scheme and the duplication scheme so as to quickly complete the connection setting of the sub-display 200 [S114]. That is, when the first connection scheme icon 1021-3 of the third set 3 is selected, while specifying that the sub-display 200 is disposed on the right side of the user terminal 100, it may be specified that the sub-display 200 is used in the extension scheme. In addition, when the second connection scheme icon 1022-3 of the third set 3 is selected, while specifying that the sub-display 200 is disposed on the right side of the user terminal 100, it may be specified that the sub-display 200 is used in the duplication scheme. One of the first connection scheme icon 1021-3 and the second connection scheme icon 1022-3 of the third set 3 may not be displayed based on the past connection history or the preset default display connection setting, which is as described above.

Figure 13:
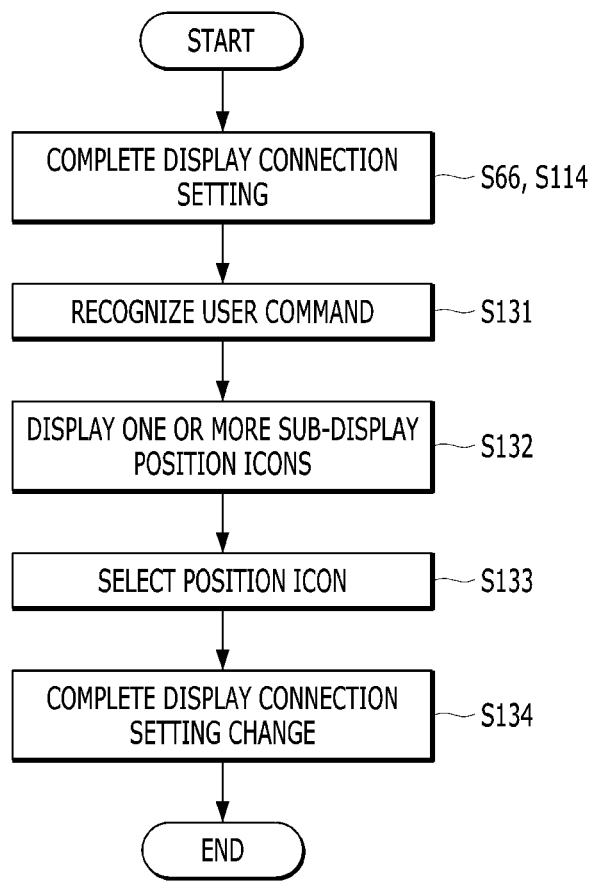
FIG. 13 shows a flowchart for changing connection setting between a user terminal and an external display according to an embodiment of the present disclosure.

Hereinabove, the connection setting between the user terminal 100 and the external display 200 has been described. Hereinafter, with reference to FIGS. 13 to 24, changing the connection setting after the connection setting between the user terminal 100 and the external display 200 is completed will be described. FIG. 13 shows a flowchart for changing connection setting between a user terminal and an external display according to an embodiment of the present disclosure, FIG. 14 shows a user terminal based on a change in connection setting in FIG. 13, FIGS. 15 to 23 show a user terminal and an external display based on a change in connection setting in FIG. 13, and FIG. 24 shows a user terminal based on a change in connection setting in FIG. 13.

Figure 14:
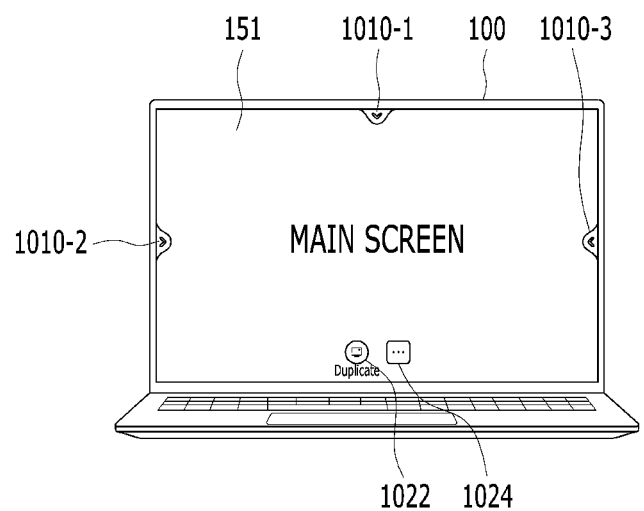
FIG. 14 shows a user terminal based on a change in connection setting in FIG. 13.

When the connection setting is completed with the extension scheme between the user terminal 100 and the external display 200, as shown in FIG. 14, in response to a user command, the controller 180 may allow at least one of the upper icon 1010-1, the left icon 1010-2, the right icon 1010-3, the second connection scheme icon 1022, and a connection setting icon 1024 to be displayed on the main display 151 of the user terminal 100. The upper icon 1010-1 may be allocated to the upper region of the main display 151, the left icon 1010-2 may be allocated to the left region of the main display 151, the right icon 1010-3 may be allocated to the right region of the main display 151, and the second connection scheme icon 1022 and the connection setting icon 1024 may be allocated to the lower region of the main display 151. Although not shown, when the connection setting is completed with the duplication scheme between the user terminal 100 and the external display 200, instead of the second connection scheme icon 1022, the first connection scheme icon may be displayed. In this regard, the lower region is merely exemplary and another region is able to be defined.

Hereinafter, this will be described in more detail.

Figure 15:
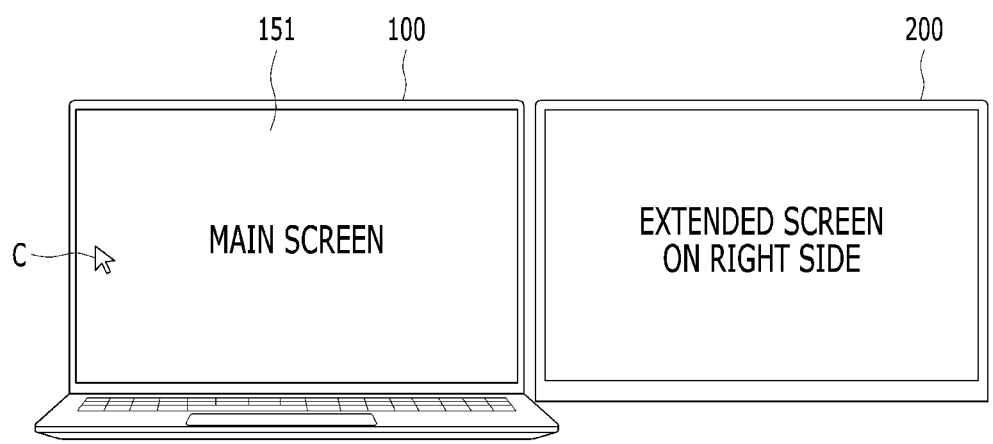
FIGS. 15 to 23 show a user terminal and an external display based on a change in connection setting in FIG. 13.

First, as described above, the connection setting may be completed with a rightward extension scheme between the user terminal 100 and the sub-display 200 [S66 and S114]. That is, as shown in FIG. 15, the sub-display 200 may be connected to the user terminal 100 with the rightward extension scheme so as to be specified to be disposed on the right side of the user terminal 100.

In this regard, the user may desire to move the sub-display 200 disposed on the right side of the user terminal 100 to a position on the left side of the user terminal 100 based on a need thereof and use the sub-display 200 in a leftward extension scheme.

In this case, the user may input a first user command to the user terminal 100 [S131]. As an example of the first user command, as shown in FIG. 15, the mouse cursor C (or a touch pad cursor) may stay in the left region of the main display 151 for a predetermined time (e.g., 2 seconds) or longer. The first user command is not limited thereto. For example, when the main display 151 is formed as the touch screen, the first user command may be touching of the left region of the main display 151 for the predetermined time or longer.

Figure 16:
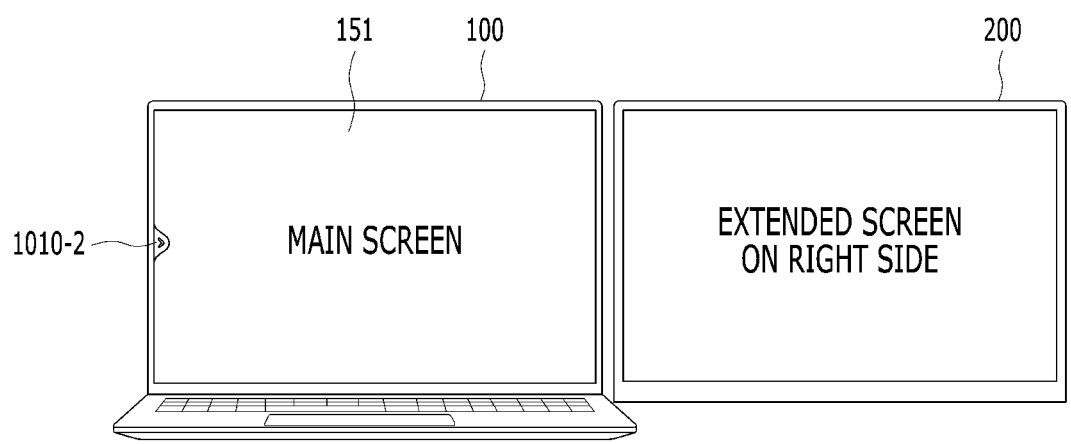

Then, as shown in FIG. 16, the controller 180 may control the left icon 1010-2 allocated to the left region of the main display 151 to be displayed [S132]. The left icon 1010-2 may disappear when not being selected within a predetermined time (e.g., 2 seconds) from a time point of display (or a time point at which the mouse cursor leaves the left region or a time point at which the touch is released).

Figure 17:
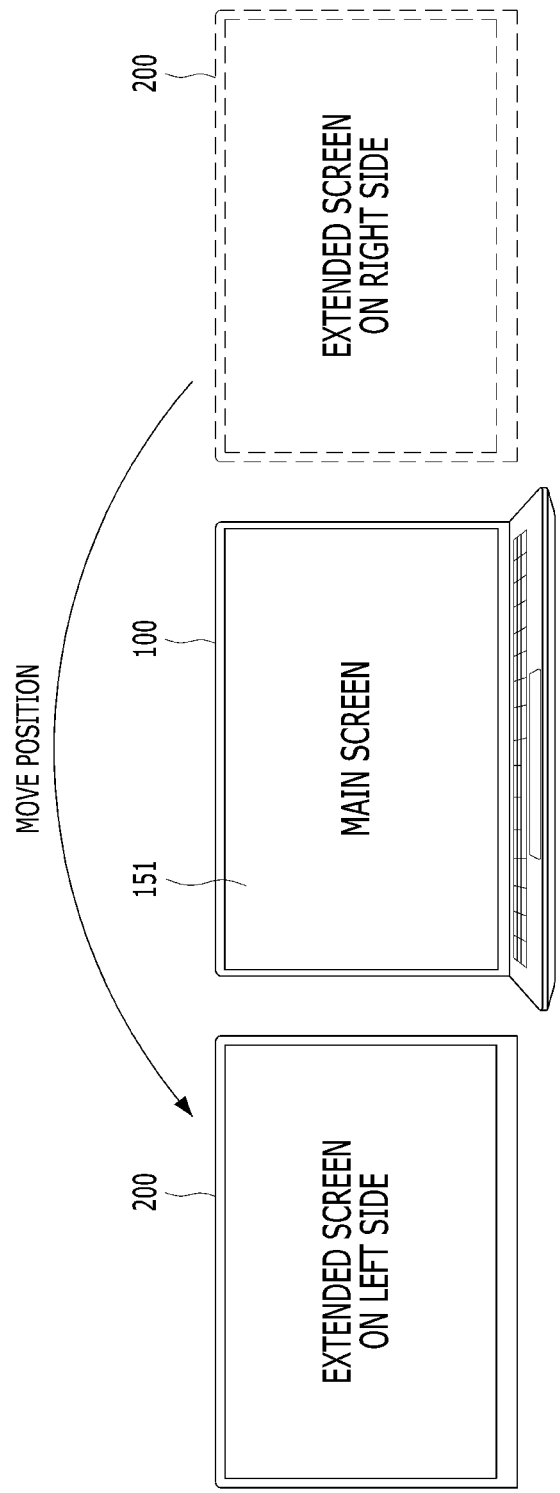

When the left icon 1010-2 is selected, the controller 180 may change the connection setting such that the sub-display 200 is disposed on the left side of the user terminal 100, as shown in FIG. 17 [S133 and S134]. Accordingly, the user may move the sub-display 200 to the left side of the user terminal 100 to continue using the sub-display 200 in the leftward extension scheme.

From a user's point of view, the connection setting related to the arrangement of the sub-display 200 may be changed easily via the left icon 1010-2 with no need to call the display setting menu 151-10 shown in FIG. 5 and change the position of the sub-display 200 via the display arrangement detailed menu 151-11.

On the other hand, the user may desire to move the sub-display 200 disposed on the left side of the user terminal 100 so as to be located above the user terminal 100 and use the sub-display 200 in an upward extension scheme based on a need thereof.

Figure 18:
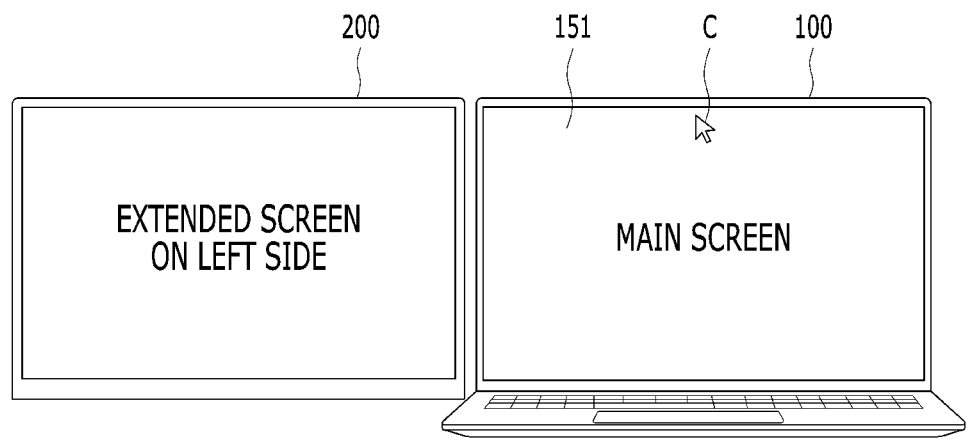

In this case, the user may input a second user command to the user terminal 100 [S131]. As an example of the second user command, as shown in FIG. 18, the mouse cursor C (or the touch pad cursor) may stay in the upper region of the main display 151 for a predetermined time (e.g., 2 seconds) or longer. The second user command is not limited thereto. For example, when the main display 151 is formed as the touch screen, the second user command may be touching of the upper region of the main display 151 for the predetermined time or longer.

Figure 19:
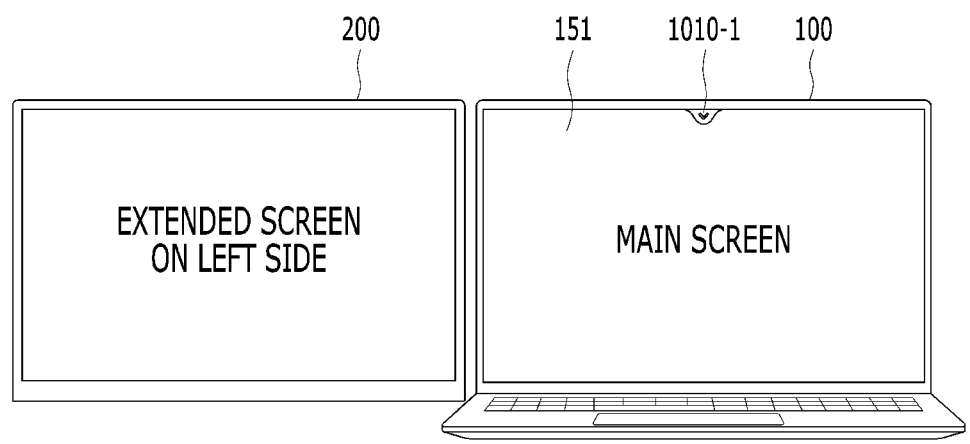

Then, as shown in FIG. 19, the controller 180 may control the upper icon 1010-1 allocated to the upper region of the main display 151 to be displayed [S132]. The upper icon 1010-1 may disappear when not being selected within a predetermined time (e.g., 2 seconds) from a time point of display (or a time point at which the mouse cursor leaves the upper region or a time point at which the touch is released).

Figure 20:
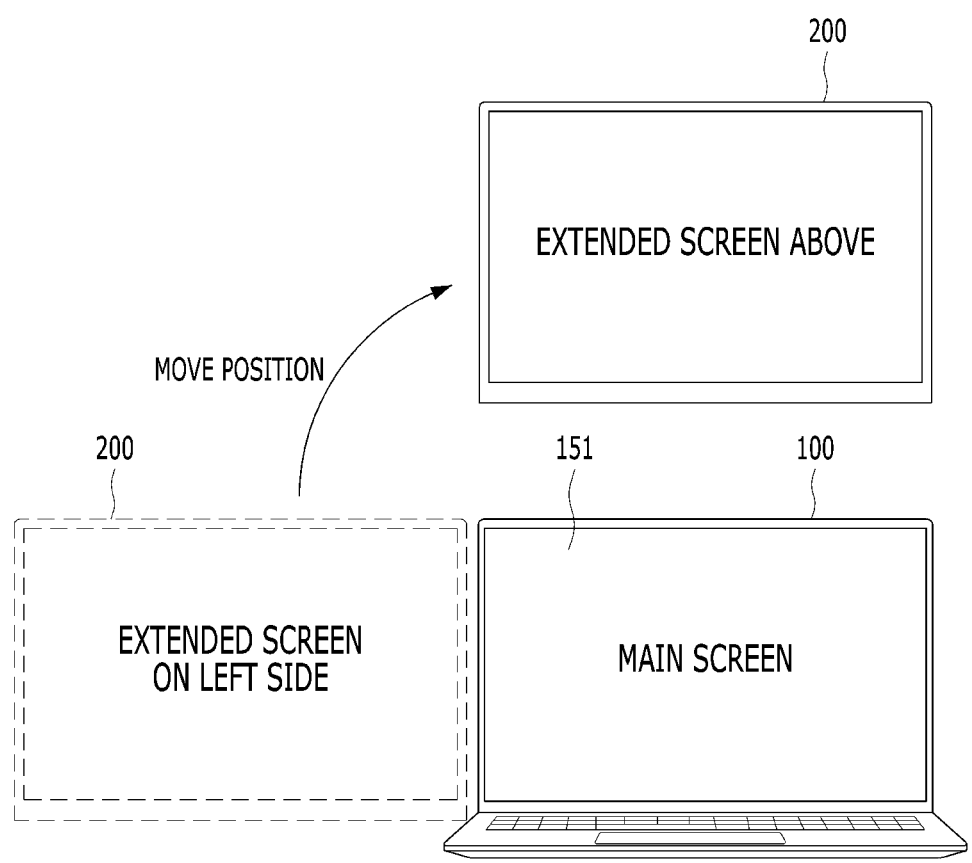

When the upper icon 1010-1 is selected, the controller 180 may change the connection setting such that the sub-display 200 is disposed above the user terminal 100, as shown in FIG. 20 [S133 and S134]. Accordingly, the user may move the sub-display 200 so as to be located above the user terminal 100 to continue using the sub-display 200 in the upward extension scheme.

From the user's point of view, the connection setting related to the arrangement of the sub-display 200 may be changed easily via the upper icon 1010-1 with no need to call the display setting menu 151-10 shown in FIG. 5 and change the position of the sub-display 200 via the display arrangement detailed menu 151-11.

Although not shown, the user may desire to move the sub-display 200 disposed on the left side of the user terminal 100 so as to be located on the right side of the user terminal 100 and use the sub-display 200 in the rightward extension scheme based on a need thereof.

In this case, the user may input a third user command to the user terminal 100 to call the right icon 1010-3 allocated to the right region. As an example of the third user command, the mouse cursor C (or the touch pad cursor) may stay in the right region of the main display 151 for a predetermined time (e.g., 2 seconds) or longer. The third user command is not limited thereto. For example, when the main display 151 is formed as the touch screen, the third user command may be touching of the upper region of the main display 151 for the predetermined time or longer.

The user may select the right icon 1010-3 to change the connection setting such that the sub-display 200 is disposed on the right side of the user terminal 100, and move the sub-display 200 to be located on the right side of the user terminal 100 and continue using the sub-display 200 in the rightward extension scheme.

In one example, the user may desire to use the sub-display 200 connected to the user terminal 100 in the duplication scheme based on the need thereof.

Figure 21:
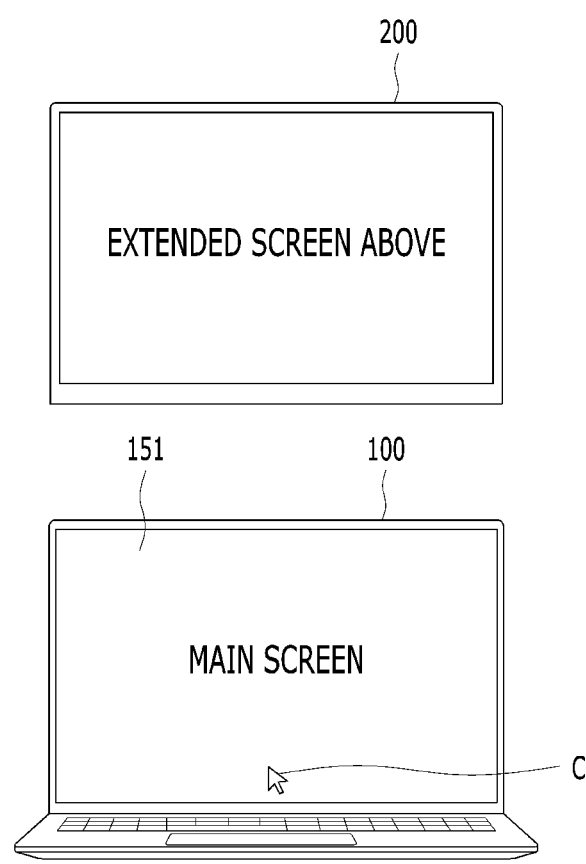

In this case, the user may input a fourth user command to the user terminal 100. As an example of the fourth user command, as shown in FIG. 21, the mouse cursor C (or the touch pad cursor) may stay in the lower region of the main display 151 for a predetermined time (e.g., 2 seconds) or longer. The fourth user command is not limited thereto. For example, when the main display 151 is formed as the touch screen, the fourth user command may be touching of the lower region of the main display 151 for the predetermined time or longer.

Figure 22:
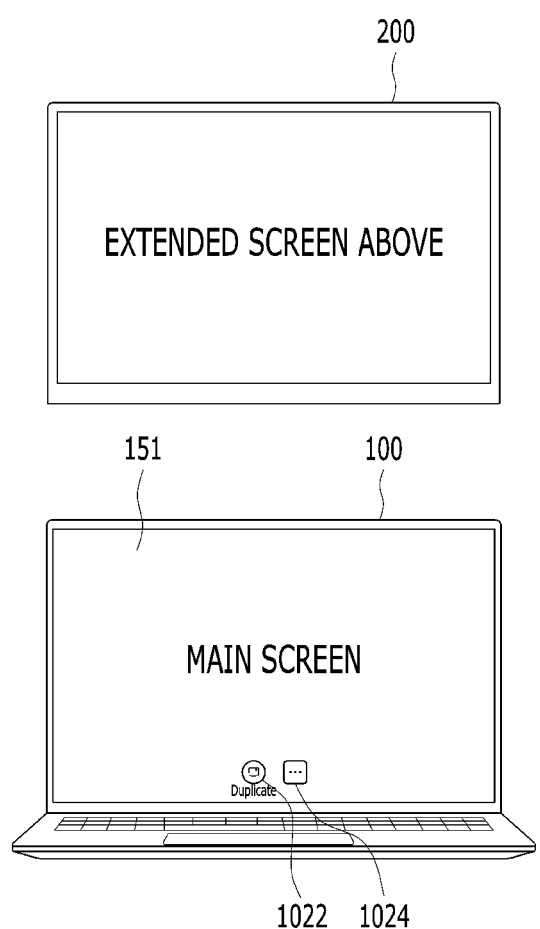

Then, as shown in FIG. 22, the controller 180 may control the second connection scheme icon 1022 and the connection setting icon 1024 allocated to the lower region of the main display 151 to be displayed. The second connection scheme icon 1022 and the connection setting icon 1024 may disappear when not being selected within a predetermined time (e.g., 2 seconds) from a time point of display (or a time point at which the mouse cursor leaves the lower region or a time point at which the touch is released).

Figure 23:
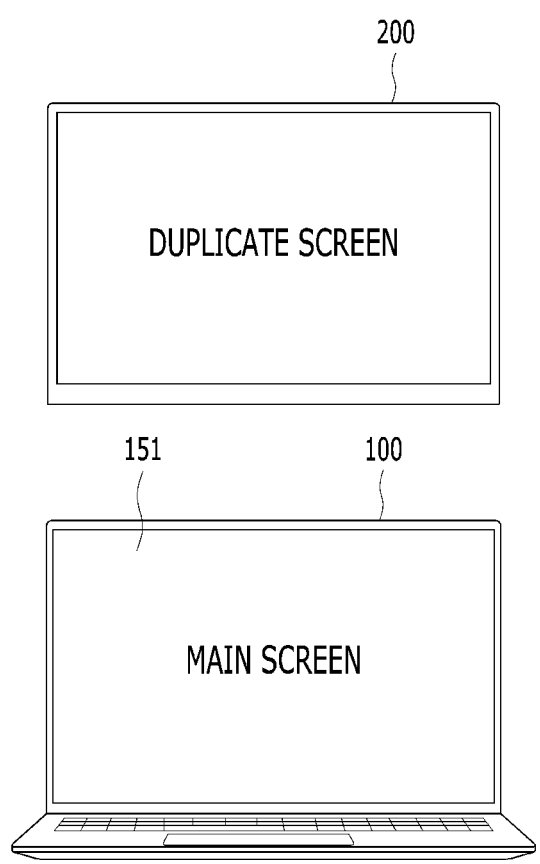
Figure 24:
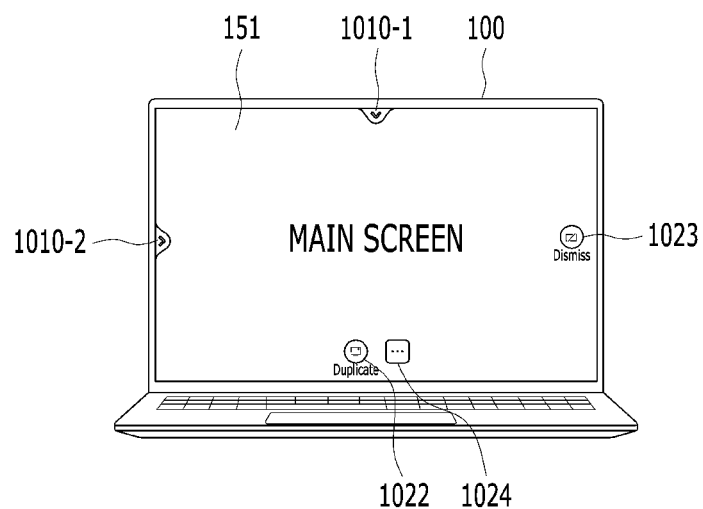
FIG. 24 shows a user terminal based on a change in connection setting in FIG. 13.

When the second connection scheme icon 1022 is selected, the controller 180 may change the connection setting such that the sub-display 200 is connected to the user terminal 100 in the duplication scheme, as shown in FIG. 23. Accordingly, the user may continue using the sub-display 200 in the duplication scheme.

From the user's point of view, the connection setting related to the display connection scheme of the sub-display 200 may be changed easily via the second connection scheme icon 1022 with no need to call the display setting menu 151-10 shown in FIG. 5 and activate the display connection scheme detailed menu 151-12.

The connection setting icon 1024 is for calling the display setting menu 151-10 shown in FIG. 5, which is as described above.

Although not shown, when the fourth user command is input while the sub-display 200 is being connected to the user terminal 100 in the duplication scheme, the first connection scheme icon 1021 may be displayed instead of the second connection scheme icon 1022. When the first connection scheme icon 1021 is selected, the connection setting may be changed such that the sub-display 200 is connected to the user terminal 100 in the extension scheme. The arrangement position of the sub-display 200 may be set by the user by inputting one of the first to third user commands, which is as described above.

In one example, as shown in FIG. 14, it has been described that the upper icon 1010-1 is allocated to the upper region of the main display 151, the left icon 1010-2 is allocated to the left region of the main display 151, and the right icon 1010-3 is allocated to the right region of the main display 151. However, when the sub-display 200 is disposed on the right side of the user terminal 100 and connected to the mobile terminal 100 in the rightward extension scheme, the right icon 1010-3 may not need to be allocated to the right region of the main display 151. Similarly, when the sub-display 200 is disposed above or on the left side of the user terminal 100 and is connected to the user terminal 100 in the upward or leftward extension scheme, the upper icon 1010-1 or the left icon 1010-2 may not need to be allocated to the upper or the left region of the main display 151.

This will be described with further reference to FIG. 24. It is assumed in FIG. 24 that the sub-display 200 is disposed on the right side of the user terminal 100 and is connected to the user terminal 100 in the rightward extension scheme.

When the sub-display 200 is disposed on the right side of the user terminal 100 and connected to the user terminal 100 in the rightward extension scheme as described above, the right icon 1010-3 may not need to be allocated to the right region of the main display 151. In this case, the connection release icon 1023 may not be necessary to be allocated to the right region of the main display 151 instead of the right icon 1010-3.

Therefore, when the user desires to release the connection between the user terminal 100 and the sub-display 200 in the state in which the sub-display 200 is disposed on the right side of the user terminal 100 and is connected to the user terminal 100 in the rightward extension scheme, the user may input the third user command.

Then, the controller 180 may display the connection release icon 1023 in the right region of the main display 151. The user may easily release the connection between the user terminal 100 and the sub-display 200 by selecting the connection release icon 1023.

When the sub-display 200 is disposed above or on the left side of the user terminal 100 and is connected to the user terminal 100 in the upward or leftward extension scheme, the connection release icon 1023 may be allocated to the upper or left region of the main display 151 instead of the upper icon 1010-1 or the left icon 1010-2.

Figure 25:
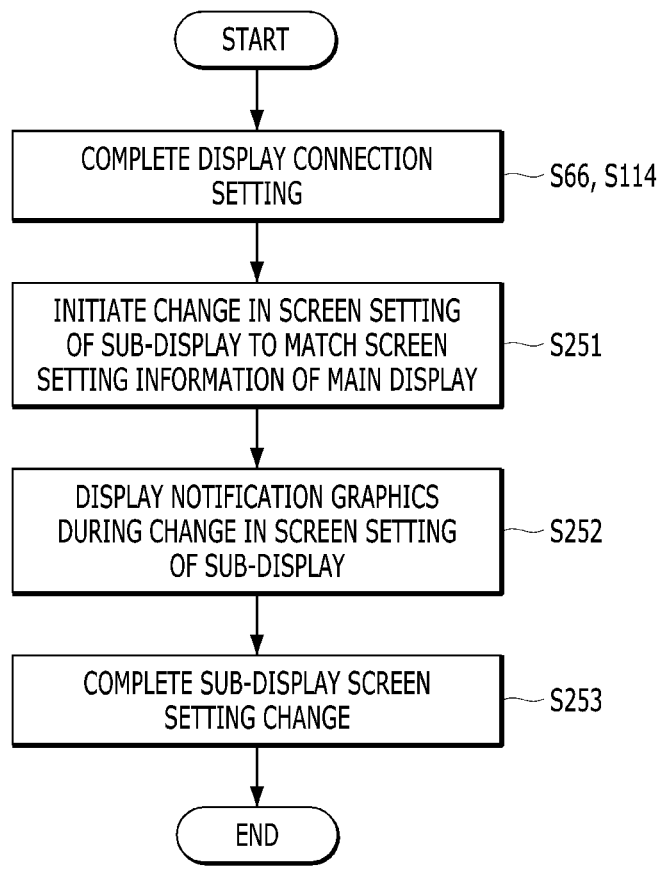
FIG. 25 shows a flowchart for changing screen setting of an external display to match screen setting of a user terminal according to an embodiment of the present disclosure.

Hereinabove, the connection setting between the user terminal 100 and the sub-display 200 and the change thereof have been described. A preset screen setting (hereinafter, referred to as a "first screen setting") of the main display 151 of the user terminal 100 may be different from a preset screen setting of the sub-display 200. In this case, when the sub-display 200 is connected to the user terminal 200, because the screen settings thereof are different from each other, the user may feel a sense of heterogeneity between the main display 151 and the sub-display 200. In this regard, the screen setting refers to setting for screen visual components such as a screen brightness, a contrast, a sharpness, a color temperature, and the like (but not limited thereto). Therefore, when the sub-display 200 is connected to the user terminal 100, it may be necessary to change the screen setting of the sub-display 200 to match the first screen setting. This will be described with further reference to FIGS. 25 to 30. FIG. 25 shows a flowchart for changing screen setting of an external display to match screen setting of a user terminal according to an embodiment of the present disclosure, and FIGS. 26 to 30 show a user terminal and an external display based on a change in screen setting in FIG. 25.

Figure 26:
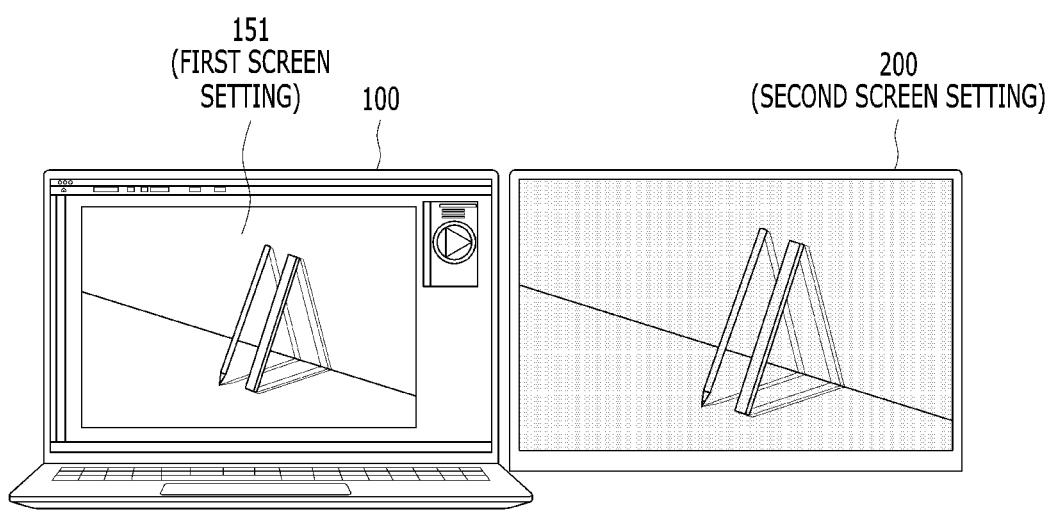
FIGS. 26 to 30 show a user terminal and an external display based on a change in screen setting in FIG. 25.

As shown in FIG. 26, the user terminal 100 in which the first screen setting is preset on the main display 151, and the sub-display 200 on which a second screen setting is preset may be connected to each other [S66 and S114]. In this case, because the screen settings thereof are different from each other, the user may feel the sense of heterogeneity between the main display 151 and the sub-display 200, which is as described above.

The controller 180 may initiate the change in the screen setting of the sub-display 200 to match the first screen setting of the main display 151 when it is detected that the sub-display 200 is connected to the user terminal 100 [S251].

The controller 180 may initiate the change in the screen setting as soon as it is detected that the sub-display 200 is connected to the user terminal 100, or may receive the second screen setting of the sub-display 200 from the sub-display 200 when it is detected that the sub-display 200 is connected to the user terminal 100 and may initiate the change in the screen setting when it is determined that the received second screen setting is different from the first screen setting of the main display 151.

The controller 180 may control the sub-display 200 such that the screen setting of the sub-display 200 is changed to match the first screen setting while transmitting the first screen setting to the sub-display 200. That is, the controller 180 may change the screen setting of the sub-display 200 from the second screen setting to the first screen setting.

Figure 27:
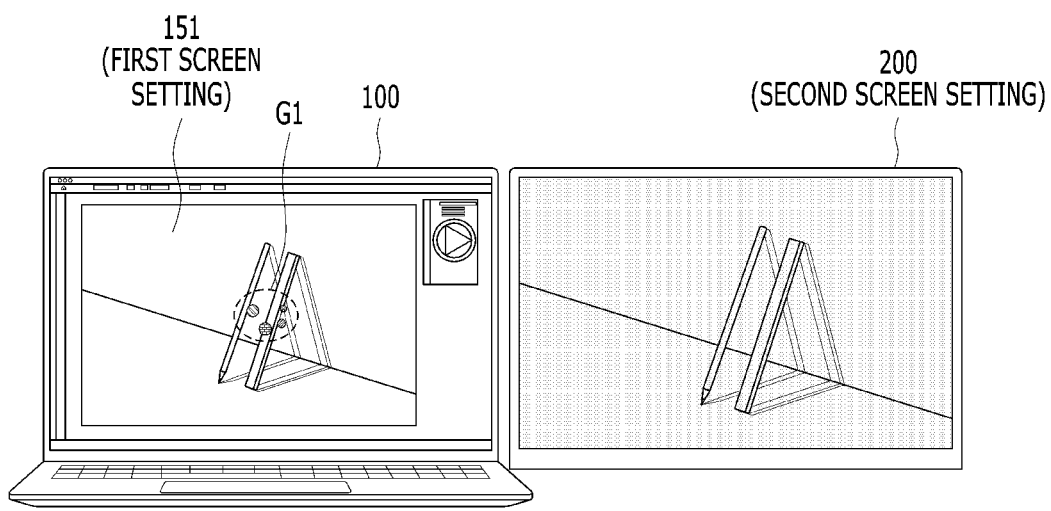
Figure 28:
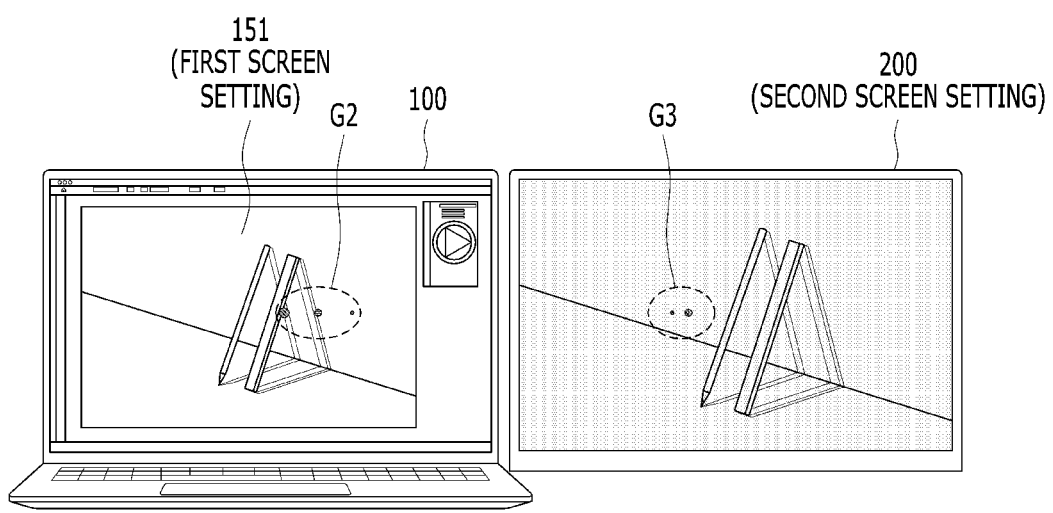
Figure 29:
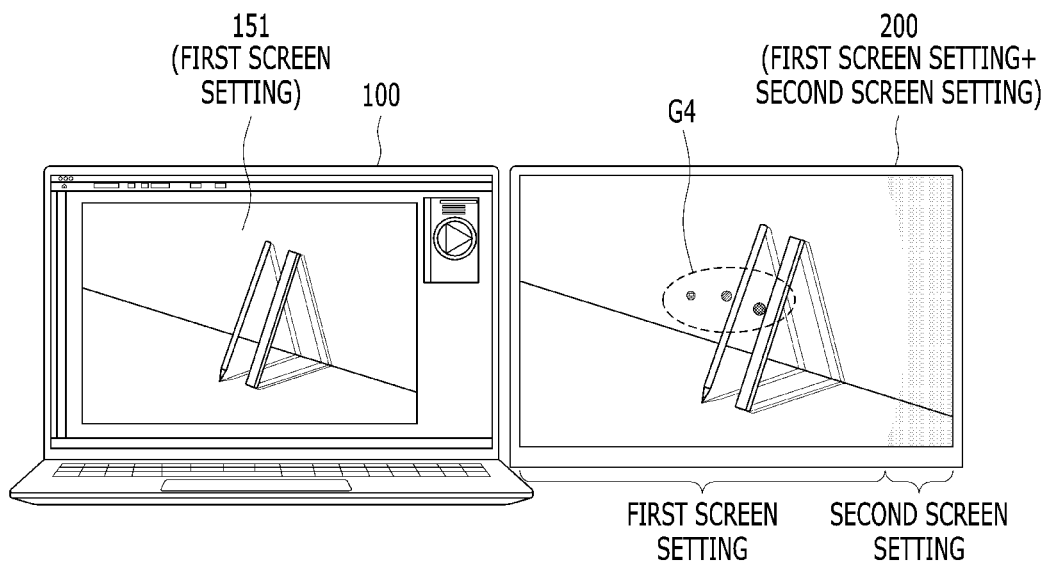

While the change in the screen setting of the sub-display 200 is in progress, as shown in FIGS. 27 to 29, the controller 180 may control notification graphics G1, G2, G3, and G4 indicating that the change in the screen setting of the sub-display 200 is in progress to be displayed [S252]. The notification graphics may be displayed overlapping with screens that have been being displayed on the main display 151 and the sub-display 200. The notification graphics may be configured to have an animation effect.

First, as shown in FIG. 27, the controller 180 may control a first notification graphic G1 to be displayed on the main display 151.

Then, as shown in FIG. 28, the controller 180 may control the first notification graphic G1 to move in a direction in which the second sub-display is disposed (i.e., a rightward direction) and to be separated into a second notification graphic G2 and a third notification graphic G3 such that the second notification graphic G2 is displayed on the main display 151 and the third notification graphic G3 moves to the sub-display 200 and is displayed on the sub-display 200.

Then, as shown in FIG. 29, the controller 180 may control the second notification graphic G2 to be also moved to the sub-display 200 and be displayed on the sub-display 200 while constituting a fourth notification graphic G4 together with the third notification graphic G3.

Accordingly, while seeing the notification graphics G1, G2, G3, and G4 move in the rightward direction from the main display 151 to the sub-display 200, the user may intuitively know that the second screen setting of the sub-display 200 is being changed to match the first screen setting of the main display 151.

In addition, as shown in FIG. 29, the controller 180 may control the second screen setting of the sub-display 200 to be changed into the first screen setting in a wipe screen switching scheme. That is, considering that the sub-display 200 is disposed on the right side of the user terminal 100, the second screen setting may be changed into the first screen setting in the wipe screen switching scheme from the left to the right of the sub-display 200.

When the sub-display 200 is disposed above or on the left side of the user terminal 100, the controller 180 may control the second screen setting to be changed into the first screen setting in the wipe screen switching scheme from the bottom to the top or from the right to the left of the sub-display 200 while the notification graphics G1, G2, G3, and G4 move in the upward direction or in the leftward direction from the main display 151 to the sub-display 200.

Figure 30:
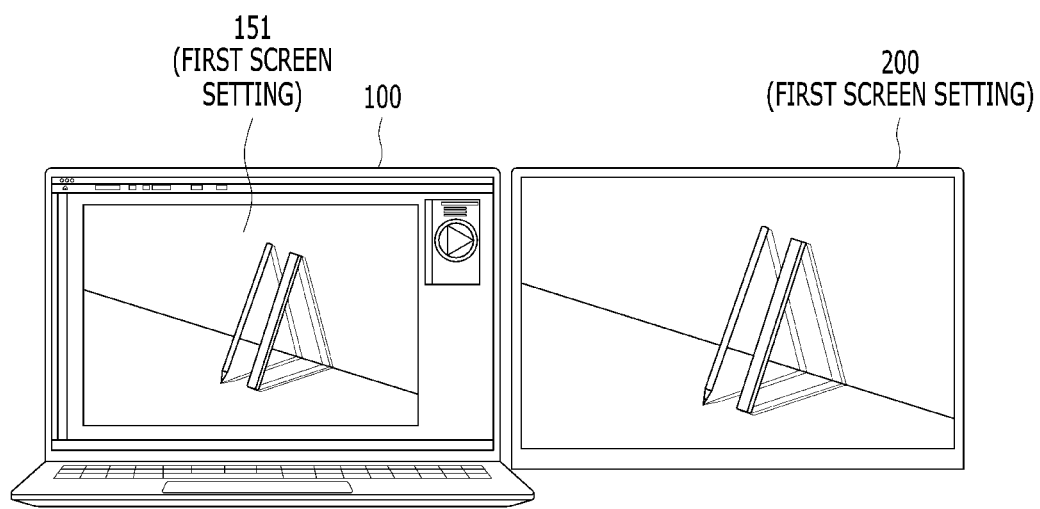

As shown in FIG. 30, the controller 180 may complete the change of the screen setting of the sub-display 200 from the second screen setting to the first screen setting [S253]. As the change in the screen setting is completed, the notification graphics G1, G2, G3, and G4 may no longer be displayed.

While the change in the screen setting of the sub-display 200 is in progress, as shown in FIGS. 27 to 29, the controller 180 may control the notification graphics G1, G2, G3, and G4 indicating that the change in the screen setting of the sub-display 200 is in progress to be displayed [S252].

In one example, the user terminal 100 may not be equipped with the illuminance sensor, but the sub-display 200 may be equipped with the illuminance sensor. In this case, the controller 180 may control ambient light brightness information sensed by the illuminance sensor to be received from the sub-display 200, control the first screen setting of the main display 151 to be determined based on the received ambient light brightness information, and control the screen setting of the sub-display 200 to be changed from the second screen setting to the first screen setting.

Hereinabove, it has been described that the notification graphics G1, G2, G3, and G4 are displayed to inform that the change in the screen setting of the sub-display 200 is in progress while the change in the screen setting of the sub-display 200 is in progress. However, the present disclosure is not limited thereto. After the change in the screen setting of the sub-display 200 is completed, in order to inform that the change in the screen setting of the sub-display 200 is completed, the notification graphics G1, G2, G3, and G4 may be displayed in the same scheme as described above.

Figure 31:
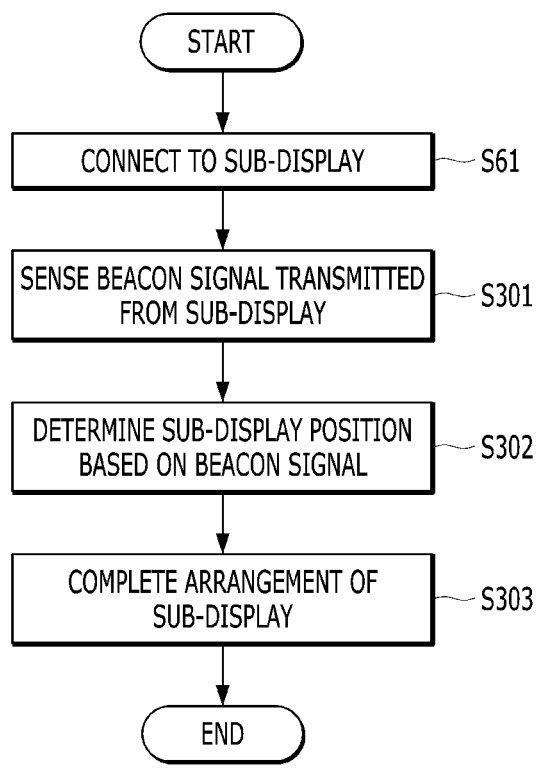
FIG. 31 shows a flowchart for connecting an external display to a user terminal according to an embodiment of the present disclosure.
Figure 32:
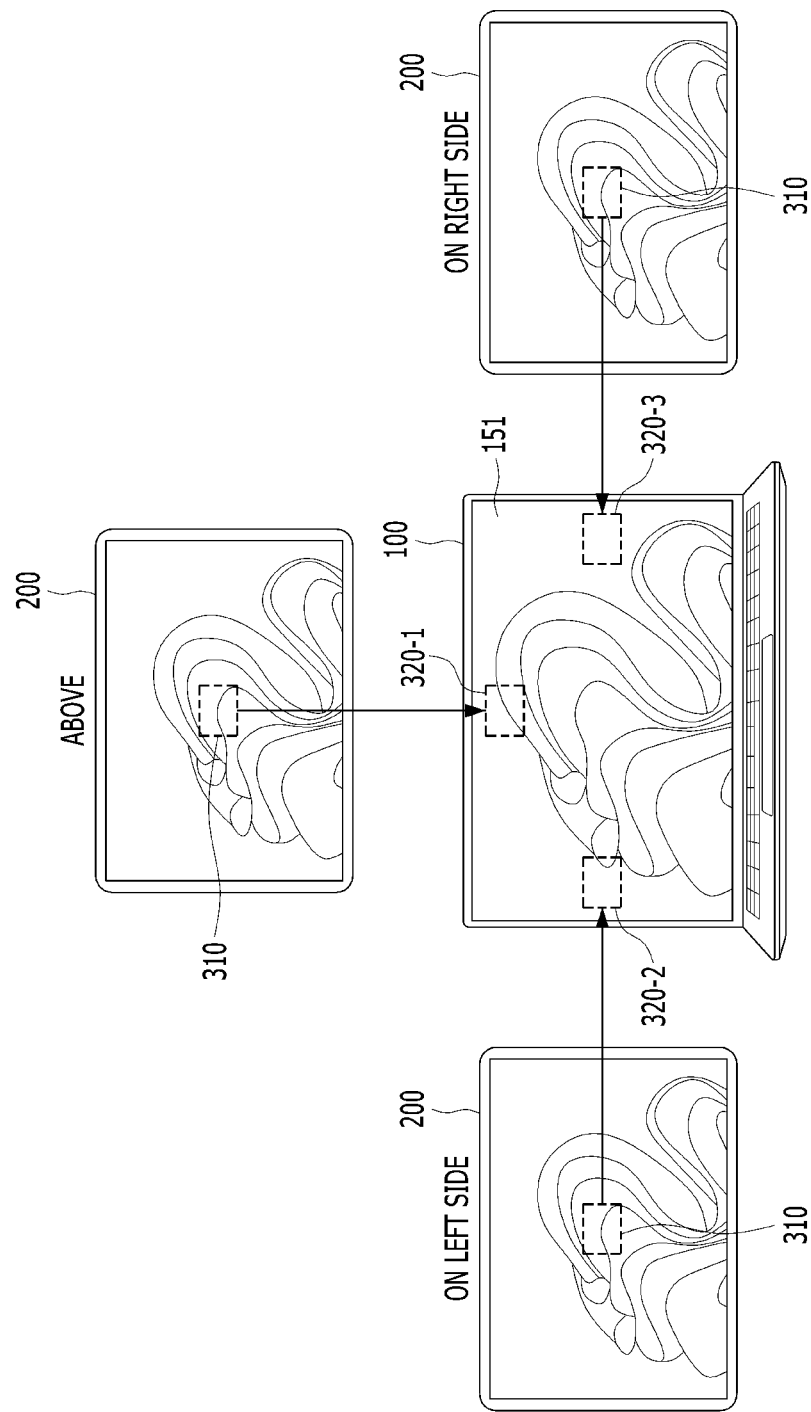
FIG. 32 shows a user terminal and an external display connected to each other according to FIG. 31.

Hereinabove, it has been described that the relative position of the sub-display 200 with respect to the user terminal 100 is manually recognized by the user terminal 100 via the user command by the user as described with reference to FIGS. 7 and 12. However, the present disclosure is not limited thereto. The relative position of the sub-display 200 with respect to the user terminal 100 may be automatically recognized by the user terminal 100. This will be described with reference to FIGS. 31 and 32. FIG. 31 shows a flowchart for connecting an external display to a user terminal according to an embodiment of the present disclosure, and FIG. 32 shows a user terminal and an external display connected to each other according to FIG. 31.

As shown in FIG. 31, the sub-display 200 may be equipped with a transmitter 310 for short-range communication. In addition, a first receiver 320-1 for short-range communication, a second receiver 320-2 for short-range communication, and a third receiver 320-3 for short-range communication may be mounted at an upper side, a left side, and a right side of the user terminal 100, respectively. The receivers may be mounted inside a main body of the user terminal 100 or may be mounted in a main body housing.

The external display 200 may be connected to the user terminal 100 in the wired or wireless manner as the sub-display [S61].

The sub-display 200 may activate the transmitter 310 for the short-range communication for a predetermined time from a time point at which the sub-display 200 is connected to the user terminal 100 or periodically activate the transmitter 310 at a predetermined time interval from the time point at which the sub-display 200 is connected to the user terminal 100 so as to transmit a beacon signal.

The controller 180 of the user terminal 100 may receive the beacon signal via the first receiver 320-1 for the short-range communication, the second receiver 320-2 for the short-range communication, and the third receiver 320-3 for the short-range communication [S301].

The controller 180 may compare a first receiver signal strength indicator (RSSI) of the beacon signal received via the first receiver 320-1 for the short-range communication, a second RSSI of the beacon signal received via the second receiver 320-2 for the short-range communication, and a third RSSI of the beacon signal received via the third receiver 320-3 for the short-range communication with each other so as to determine the relative position of the sub-display 200 with respect to the user terminal 100 [S302].

That is, the controller 180 may determine that the sub-display 200 is disposed above the user terminal 100 when the first received signal strength is the highest, may determine that the sub-display 200 is disposed on the left side of the user terminal 100 when the second received signal strength is the highest, and ay determine that the sub-display 200 is disposed on the right side of the user terminal 100 when the third received signal strength is the highest.

The controller 180 may automatically set the arrangement of the sub-display 200 based on the relative position of the sub-display 200 with respect to the user terminal 100 based on the determination [S303].

The setting related to the connection scheme of the sub-display 200 is as described above.

Hereinabove, it has been described that the relative position of the sub-display 200 with respect to the user terminal 100 is automatically recognized by the user terminal 100 via the transmitter and the receiver of the beacon signal.

In one example, a magnet and a hall sensor may be utilized instead of the transmitter and the receiver of the beacon signal, and the relative position of the sub-display 200 with respect to the user terminal 100 may be automatically recognized by the user terminal 100. For example, a magnet may be mounted at a peripheral edge of the sub-display 200. In addition, instead of the first receiver 320-1 for the short-range communication, the second receiver 320-2 for the short-range communication, and the third receiver 320-3 for the short-range communication, a first hall sensor, a second hall sensor, and a third hall sensor may be respectively mounted in the user terminal 100 so as to detect a magnetic field of the magnet. In this case, the controller 180 may compare a first magnetic field strength of the magnet detected via the first hall sensor, a second magnetic field strength of the magnet sensed via the second hall sensor, and a third magnetic field strength of the magnet sensed via the third hall sensor with each other so as to recognize the relative position of the sub-display 200 with respect to the user terminal 100.

In addition, the relative position of the sub-display 200 with respect to the user terminal 100 may be recognized by the user terminal 100 using an ultrasonic generator and an ultrasonic sensor. For example, the sub-display 200 may be equipped with the ultrasonic generator. In addition, instead of the first receiver 320-1 for the short-range communication, the second receiver 320-2 for the short-range communication, and the third receiver 320-3 for the short-range communication, a first ultrasonic sensor, a second ultrasonic sensor, and a third ultrasonic sensor for detecting an ultrasonic wave output from the ultrasonic generator may be respectively mounted in the user terminal 100. In this case, the sub-display 200 may activate the ultrasonic generator 310 for a predetermined time from the time point at which the sub-display 200 is connected to the user terminal 100 or periodically activate the ultrasonic generator 310 at a predetermined time interval from the time point of the connection so as to output the ultrasonic wave, and the controller 180 may compare a first ultrasonic intensity sensed by the first ultrasonic sensor, a second ultrasonic intensity sensed by the second ultrasonic sensor, and a third ultrasonic intensity sensed by the third ultrasonic sensor with each other so as to determine the relative position of the sub-display 200 with respect to the user terminal 100.

That is, the receiver for the short-range communication, the hall sensor, and the ultrasonic sensor may operate as a detector for the user terminal 100 to detect the sub-display 200.

Figure 33:
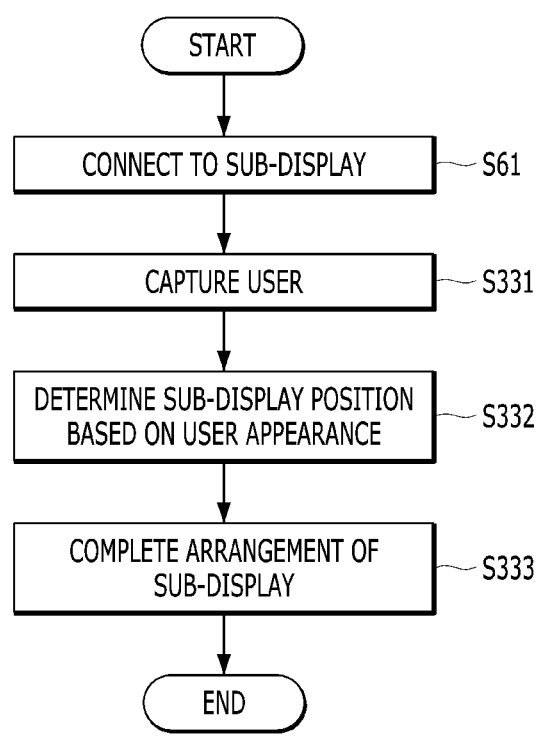
FIG. 33 shows a flowchart for connecting an external display to a user terminal according to an embodiment of the present disclosure.

In one example, based on an appearance of the user captured by the camera 121 mounted on the user terminal 100, the relative position of the sub-display 200 with respect to the user terminal 100 may be automatically recognized by the user terminal 100. That is, the camera 121 may operate as the detector for detecting the sub-display 200. This will be further described with reference to FIGS. 33 and 34. FIG. 33 shows a flowchart for connecting an external display to a user terminal according to an embodiment of the present disclosure, and FIG. 34 shows a user terminal and an external display connected to each other according to FIG. 33.

As shown in FIG. 34, the user terminal 100 may be equipped with the camera 121 so as to capture the user looking at the main display 151. It is shown in FIG. 34 that the camera 121 protrudes out of an upper bezel of the main display 151, but this is merely an example. As long as the camera 121 is able to capture the user facing the main display 151, an arrangement of the camera 121 is not limited. For example, the camera 121 may be disposed inwardly of the upper bezel of the main display 151. The present disclosure is not limited thereto.

The external display 200 may be connected to the user terminal 100 in the wired or wireless manner as the sub-display [S61].

The controller 180 of the user terminal 100 may activate the camera 121 for a predetermined time from the time point at which the sub-display 200 is connected to the user terminal 100 or periodically activate the camera 121 at a predetermined time interval from the time point of the connection so as to capture the appearance of the user looking at the main display 151 and recognize an image of the user appearance [S331].

The controller 180 may determine the relative position of the sub-display 200 with respect to the user terminal 100 based on the captured user appearance [S332].

For example, the user facing the main display 151 may take a posture for viewing the sub-display 200 together. That is, at least one of eyes, a face, and an upper body of the user may be slightly turned in a direction of the sub-display 200. In addition, one side of the user corresponding to the position of the sub-display 200 may be brighter because of light shining from the sub-display 200 toward the user. For example, when the sub-display 200 is disposed on the right side of the user terminal 100, a right side of the user may be brighter than a left side of the user.

The controller 180 may determine the relative position of the sub-display 200 with respect to the user terminal 100 based on at least one of a gaze, the posture, and the brightness of the user.

To this end, the controller 180 may utilize the artificial intelligence. That is, the user terminal 100 may be equipped with an artificial intelligence model (e.g., a CNN-based model) for learning and/or inferring data about the gaze, the posture, and/or a behavior pattern of the user. The controller 180 may learn the data about the captured gaze, posture, and/or behavior pattern of the user based on the position of the sub-display 200 via the artificial intelligence model, and may extract a feature vector from the captured gaze, posture, and/or behavior pattern of the user so as to infer which side of the user terminal 100 the connected sub-display 200 is located based on the extracted feature vector.

In addition, the controller 180 may identify the captured user via the artificial intelligence model. Therefore, the controller 180 may identify each of a plurality of users using the user terminal 100, and may learn the data about the gaze, the posture, and/or the behavior pattern for each identified user and infer the position of the connected sub-display 200 from the captured gaze, posture, and/or behavior pattern for each identified user. That is, the controller 180 may learn the data about the gaze, the posture, and/or the behavior pattern for each user, and when being connected to the sub-display, may infer, using the learned data, the position of the connected sub-display 200 differently for or independently of the plurality of users.

The controller 180 may automatically set the arrangement of the sub-display 200 based on the relative position of the sub-display 200 with respect to the user terminal 100 based on the determination [S333].

In one example, the artificial intelligence may also be utilized in the setting related to the connection scheme of the sub-display 200.

The controller 180 may learn data about a preferred connection scheme (the duplicate screen scheme or the extended screen scheme) for each user. Therefore, when the sub-display 200 is connected to the user terminal 100, the controller 180 may recognize the user, and automatically connect the user terminal 100 and the sub-display 200 to each other in the preferred connection scheme learned for each user.

At least one of the automatically set arrangement and connection scheme of the sub-display 200 may be different from that intended by the user. When at least one of the arrangement and the connection scheme of the sub-display 200 is different from that intended by the user, as shown in FIGS. 13 to 24, at least one of the arrangement and the connection scheme of the sub-display 200 may be manually corrected.

In addition, the artificial intelligence may be utilized in the screen settings of the main display 151 and/or the sub-display 200.

The controller 180 may learn data about a preferred screen setting for each user. Therefore, when the sub-display 200 is connected to the user terminal 100, the controller 180 may recognize the user, and automatically perform the screen setting of the main display 151 and/or the sub-display 100 based on the preferred screen setting learned for each user. For example, when the screen setting of the main display 151 is performed based on the preferred screen setting and the sub-display 200 is connected to the main display 151, the screen setting of the sub-display 200 may be performed to match the preferred screen setting. Because it has been described that the screen setting of the sub-display 200 is performed based on the screen setting of the main display 151, a detailed description will be omitted.

In addition, the controller 180 may change the preferred screen setting in real time based on the ambient light brightness information received from the sub-display 200.

The present disclosure described above may be implemented with computer-readable codes on a medium in which a program is recorded. Computer-readable media include all kinds of recording devices in which data readable by a computer system is stored. Examples of computer-readable media include a hard disk drive (HDD), a solid state disk (SSD), a silicon disk drive (SDD), a ROM, a RAM, a CD-ROM, a magnetic tape, a floppy disk, an optical data storage device, and the like. In addition, the computer may include a processor of an artificial intelligence device.

What is claimed is:

1. A user terminal comprising:
a main display;
an interface configured to connect the user terminal to an external device having a sub-display; and
a processor configured to:
control, in response to detection of the connection of the user terminal to the external device via the interface, the main display to concurrently display a plurality of stationary position icons selectable to specify a directional position of the sub-display with respect to the user terminal, wherein each of the plurality of stationary position icons corresponds to a different dedicated directional position of the sub-display with respect to the user terminal; and
control, in response to selection of a desired stationary position icon among the plurality of stationary position icons without moving of the desired stationary position icon, a connection setting of the sub-display to be performed based on the sub-display being disposed at a first directional position with respect to the user terminal, the first directional position corresponding to the selected desired stationary position icon.

2. The user terminal of claim 1, wherein the plurality of stationary position icons include an upper icon displayed at a first region of the main display, a left icon displayed at a second region of the main display, and a right icon displayed at a third region of the main display.

3. The user terminal of claim 2, wherein the processor is further configured to:
control, in response to the selection of the desired stationary position icon, the main display to display a plurality of connection scheme icons; and
control, in response to selection of a first connection scheme icon among the plurality of connection scheme icons, the connection setting of the sub-display to be performed such that the sub-display is connected to the user terminal according to a first connection scheme corresponding to the first connection scheme icon.

4. The user terminal of claim 3, wherein the processor is further configured to control the main display to display the plurality of connection scheme icons at a region of the main display corresponding to the selected desired stationary position icon.

5. The user terminal of claim 3, wherein the plurality of connection scheme icons further include a second connection scheme icon for connecting the sub-display to the user terminal according to a second connection scheme,
wherein one of the first connection scheme or the second connection scheme is an extension scheme and the other of the first connection scheme or the second connection scheme is a duplication scheme.

6. The user terminal of claim 5, wherein the plurality of connection scheme icons further include an icon for releasing the connection of the user terminal to the external device.

7. The user terminal of claim 5, wherein the processor is further configured to:
control, in response to selection of the one of the first connection scheme icon or the second connection scheme icon, a background screen displayed on the main display to be displayed on the sub-display according to the extension scheme; and
control, in response to selection of the other of the first connection scheme icon or the second connection scheme icon, the background screen displayed on the main display to be displayed on the sub-display according to the duplication scheme.

8. The user terminal of claim 3, wherein the processor is further configured to control, in response to selection of a desired region from among the first region, the second region, and the third region of the main display after the connection setting of the sub-display is completed, the stationary position icon corresponding to the selected desired region to be displayed.

9. The user terminal of claim 8, wherein the processor is further configured to control, in response to selection of the stationary position icon corresponding to the desired region, the connection setting of the sub-display to be changed for the sub-display to be disposed at a second directional position with respect to the user terminal, the second directional position corresponding to the selected stationary position icon.

10. The user terminal of claim 8, wherein the processor is further configured to control, in response to selection of a fourth region of the main display after the connection setting of the sub-display is completed, a second connection scheme icon to be displayed among the plurality of connection scheme icons.

11. The user terminal of claim 10, wherein the processor is further configured to control, in response to selection of the second connection scheme icon, the connection setting of the sub-display to be changed such that the sub-display is connected to the user terminal according to a second connection scheme corresponding to the second connection scheme icon.

12. The user terminal of claim 3, wherein the processor is further configured to control a screen setting of the sub-display to be changed based on a first screen setting of the main display.

13. The user terminal of claim 12, wherein the processor is further configured to:
receive a second screen setting of the sub-display from the external device; and
control the screen setting of the sub-display to be changed based on the second screen setting being different from the first screen setting.

14. The user terminal of claim 12, wherein the processor is further configured to control notification graphics indicating that the change of the screen setting of the sub-display is in progress to be displayed.

15. The user terminal of claim 14, wherein the processor is further configured to control a display direction of the notification graphics to be determined based on an arrangement position of the sub-display.

16. The user terminal of claim 15, wherein the processor is further configured to control the notification graphics to move from the main display to the sub-display based on the determined display direction.

17. The user terminal of claim 12, wherein the processor is further configured to:
receive ambient light brightness information from the external device; and
control the first screen setting of the main display to be determined based on the received ambient light brightness information.

18. The user terminal of claim 1, wherein the user terminal is connected to the external device in a wired or a wireless manner.

19. The user terminal of claim 1,
wherein the plurality of stationary position icons comprises:
a first stationary position icon selectable to specify that the sub-display of the external device is disposed to a left of the user terminal;
a second stationary position icon displayed concurrently with the first stationary position icon, and selectable to specify that the sub-display of the external device is disposed above the user terminal; and
a third stationary position icon displayed concurrently with the first stationary position icon and the second stationary position icon, and selectable to specify that the sub-display of the external device is disposed to a right of the user terminal, and
wherein the processor is further configured to:
in response to selection of the first stationary position icon, control a connection setting of the sub-display to be performed based on the sub-display being specified as being disposed to the left of the user terminal;
in response to selection of the second stationary position icon, control the connection setting of the sub-display to be performed based on the sub-display being specified as being disposed above the user terminal; and
in response to selection of the third stationary position icon, control the connection setting of the sub-display to be performed based on the sub-display being specified as being disposed to the right of the user terminal.

20. The user terminal of claim 19,
wherein the processor is further configured to:
in response to selection of the first stationary position icon, control the main display to cease displaying the plurality of stationary position icons;
in response to selection of the second stationary position icon, control the main display to cease displaying the plurality of stationary position icons; and
in response to selection of the third stationary position icon, control the main display to cease displaying the plurality of stationary position icons.

21. A method for controlling a user terminal, the method comprising:
connecting the user terminal to an external device having a sub-display;
concurrently displaying, at a main display of the user terminal, in response to detection of the connection of the user terminal to the external device, a plurality of stationary position icons selectable to specify a directional position of the sub-display with respect to the user terminal, wherein each of the plurality of stationary position icons corresponds to a different dedicated directional position of the sub-display with respect to the user terminal; and
performing, in response to selection of a desired stationary position icon among the plurality of stationary position icons without moving of the desired stationary position icon, a connection setting of the sub-display based on the sub-display being disposed at a first directional position with respect to the user terminal, the first directional position corresponding to the selected desired stationary position icon.

22. A recording medium for storing a program to be executed by a user terminal, wherein the program includes:
an instruction for connecting the user terminal to an external device having a sub-display;
an instruction for concurrently displaying, at a main display of the user terminal, in response to detection of the connection of the user terminal to the external device, a plurality of stationary position icons selectable to specify a directional position of the sub-display with respect to the user terminal, wherein each of the plurality of stationary position icons corresponds to a different dedicated directional position of the sub-display with respect to the user terminal; and
an instruction for performing, in response to selection of a desired stationary position icon among the plurality of stationary position icons without moving of the desired stationary position icon, a connection setting of the sub-display based on the sub-display being disposed at a first directional position with respect to the user terminal, the first directional position corresponding to the selected desired stationary position icon.

* * * * *